US011928935B2

(12) United States Patent
Sanborn et al.

(10) Patent No.: US 11,928,935 B2
(45) **Date of Patent: *Mar. 12, 2024**

(54) MYSTERY BONUS SYMBOL REVEAL

(71) Applicant: Aristocrat Technologies Australia Pty Limited, North Ryde (AU)

(72) Inventors: Hanna Lee Sanborn, Pflugerville, TX (US); Chad La Guardia, Austin, TX (US); Erick T. Ching, Cedar Park, TX (US)

(73) Assignee: Aristocrat Technologies Australia Pty Ltd., North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,388

(22) Filed: May 20, 2022

(65) Prior Publication Data

US 2022/0284773 A1 Sep. 8, 2022

Related U.S. Application Data

(63) Continuation of application No. 17/248,251, filed on Jan. 15, 2021, now Pat. No. 11,361,624, which is a (Continued)

(51) Int. Cl.
*G07F 17/32* (2006.01)

(52) U.S. Cl.
CPC ...... *G07F 17/3267* (2013.01); *G07F 17/3213* (2013.01); *G07F 17/3258* (2013.01)

(58) Field of Classification Search
CPC .. G07F 17/3265; G07F 17/34; G07F 17/3258; G07F 17/326; G07F 17/3211;
(Continued)

(56) References Cited

U.S. PATENT DOCUMENTS

| | | | |
|---|---|---|---|
| D213,676 | S | 4/1969 | Biro |
| D398,597 | S | 9/1998 | Morioka |

(Continued)

FOREIGN PATENT DOCUMENTS

| | | |
|---|---|---|
| EM | 0031804620004 | 6/2016 |
| EM | 0041240300002 | 7/2017 |
| EM | 0085382430003 | 5/2021 |

OTHER PUBLICATIONS

"Huge Win! Queen of the Nile Deluxe Slot—Max Bet Bonus!," screenshots of YouTube video, download date Apr. 30, 2019, published on Sep. 5, 2018, 7 pages.

(Continued)

*Primary Examiner* — Justin L Myhr
(74) *Attorney, Agent, or Firm* — Weaver Austin Villeneuve & Sampson LLP

(57) ABSTRACT

A method may involve determining which slot symbols will be presented on a display system for an instance of a slot game. The symbols may include one or more mystery symbols and one or more trigger symbols. The method may involve controlling the display system to present first visual effects corresponding to the instance of the game. The first visual effects may include moving symbols and landing of the one or more mystery symbols and the one or more trigger symbols. The method may involve controlling the display system to present second visual effects corresponding to the one or more mystery symbols. The second visual effects may include a first revealed mystery symbol image corresponding to a first mystery symbol. The first revealed mystery symbol image and the trigger symbols, taken together, may correspond to a feature award. The method may involve presenting third visual effects corresponding to the feature.

20 Claims, 16 Drawing Sheets

Related U.S. Application Data continuation of application No. 16/379,724, filed on Apr. 9, 2019, now Pat. No. 10,896,578.

(58) Field of Classification Search
CPC ............ G07F 17/3262; G07F 17/3213; G07F 17/3251; G07F 17/3255; G07F 17/3267; G07F 17/3286
See application file for complete search history.

(56) References Cited

U.S. PATENT DOCUMENTS

| | | | |
|---|---|---|---|
| 6,186,894 | B1 * | 2/2001 | Mayeroff ............... G07F 17/34 463/16 |
| D498,267 | S | 11/2004 | Crouch |
| 7,029,396 | B2 | 4/2006 | Jaffe |
| D560,724 | S | 1/2008 | Johnson |
| D560,725 | S | 1/2008 | Johnson |
| D623,657 | S | 9/2010 | Fitzmaurice |
| D626,560 | S | 11/2010 | Fitzmaurice |
| D627,366 | S | 11/2010 | Martiros |
| D629,420 | S | 12/2010 | O'Donnell |
| 7,988,549 | B2 | 8/2011 | Little |
| D646,336 | S | 10/2011 | Kelly |
| D646,337 | S | 10/2011 | Kelly |
| D646,695 | S | 10/2011 | Hoggarth |
| D653,261 | S | 1/2012 | Ikenoue |
| 8,123,612 | B2 | 2/2012 | Yoshizawa |
| 8,328,619 | B2 | 12/2012 | Nagano |
| D678,323 | S | 3/2013 | Yoshida |
| D678,903 | S | 3/2013 | Yoshida |
| 8,388,435 | B2 | 3/2013 | Anderson |
| D685,033 | S | 6/2013 | Wudtke |
| 8,475,261 | B2 | 7/2013 | Little |
| D704,735 | S | 5/2014 | Hollobaugh |
| D706,741 | S | 6/2014 | Myers |
| D710,882 | S | 8/2014 | Francisco |
| D712,975 | S | 9/2014 | Lesley |
| D715,323 | S | 10/2014 | Umezawa |
| D719,615 | S | 12/2014 | Inoue |
| D719,616 | S | 12/2014 | Inoue |
| D720,771 | S | 1/2015 | Lacour |
| D728,621 | S | 5/2015 | Jou |
| D732,072 | S | 6/2015 | Ying |
| D733,088 | S | 6/2015 | Garneau |
| D736,752 | S | 8/2015 | Lee |
| D737,320 | S | 8/2015 | McCormick |
| 9,105,147 | B2 | 8/2015 | Nagano |
| D740,888 | S | 10/2015 | Depalma |
| D741,368 | S | 10/2015 | Supino |
| D742,975 | S | 11/2015 | Myers |
| D748,123 | S | 1/2016 | Schwengler |
| 9,245,418 | B2 | 1/2016 | Mitchell |
| D751,098 | S | 3/2016 | Lim |
| D760,239 | S | 6/2016 | Hirai |
| D761,804 | S | 7/2016 | Hirai |
| D762,241 | S | 7/2016 | Loosli |
| D762,613 | S | 8/2016 | Garneau |
| RE46,169 | E | 10/2016 | Kelly |
| D769,260 | S | 10/2016 | Kim |
| D769,325 | S | 10/2016 | Casalegno |
| D771,041 | S | 11/2016 | Bae |
| D774,032 | S | 12/2016 | Bae |
| D776,157 | S | 1/2017 | Lajoie |
| D776,161 | S | 1/2017 | Tursi |
| D784,399 | S | 4/2017 | Herrera |
| D786,928 | S | 5/2017 | Lee |
| 9,679,435 | B2 | 6/2017 | Schrementi |
| D792,454 | S | 7/2017 | Baumez |
| D794,672 | S | 8/2017 | Hirai |
| D795,884 | S | 8/2017 | Kim |
| D812,146 | S | 3/2018 | Castro |
| D812,147 | S | 3/2018 | Castro |
| D812,148 | S | 3/2018 | Castro |
| D812,149 | S | 3/2018 | Castro |
| D818,048 | S | 5/2018 | Calhoun |
| D819,694 | S | 6/2018 | Kim |
| D819,747 | S | 6/2018 | Castro |
| D820,915 | S | 6/2018 | Lee |
| D822,117 | S | 7/2018 | Costa |
| D829,222 | S | 9/2018 | Choi |
| D832,355 | S | 10/2018 | Castro |
| D832,356 | S | 10/2018 | Castro |
| D832,357 | S | 10/2018 | Castro |
| D836,164 | S | 12/2018 | Castro |
| 10,181,236 | B2 | 1/2019 | Goldstein |
| D842,337 | S | 3/2019 | Pudipeddi |
| D842,930 | S | 3/2019 | Johnson |
| D842,932 | S | 3/2019 | Stair |
| D842,933 | S | 3/2019 | Castro |
| D843,458 | S | 3/2019 | Castro |
| D843,459 | S | 3/2019 | Castro |
| D843,460 | S | 3/2019 | Castro |
| D843,461 | S | 3/2019 | Castro |
| D843,464 | S | 3/2019 | Castro |
| D843,465 | S | 3/2019 | Castro |
| D843,467 | S | 3/2019 | Johnson |
| D843,468 | S | 3/2019 | Johnson |
| D843,469 | S | 3/2019 | Nettenstrom |
| D843,473 | S | 3/2019 | Zedell, Jr. |
| D843,474 | S | 3/2019 | Lesley |
| D843,475 | S | 3/2019 | Lesley |
| D843,476 | S | 3/2019 | Lesley |
| D843,477 | S | 3/2019 | Lesley |
| D843,478 | S | 3/2019 | Lesley |
| D843,479 | S | 3/2019 | Castro |
| D843,480 | S | 3/2019 | Castro |
| D843,482 | S | 3/2019 | Holland |
| D844,062 | S | 3/2019 | Lesley |
| D844,656 | S | 4/2019 | Toth |
| D846,650 | S | 4/2019 | Stair |
| D850,536 | S | 6/2019 | Stair |
| D852,830 | S | 7/2019 | Penacho |
| D862,602 | S | 10/2019 | Kariya |
| D866,667 | S | 11/2019 | Stair |
| D868,165 | S | 11/2019 | Ortiz De Viveiros |
| D868,714 | S | 12/2019 | Hodgson |
| D870,138 | S | 12/2019 | Penacho |
| D870,820 | S | 12/2019 | Urban |
| D871,419 | S | 12/2019 | Hu |
| D871,506 | S | 12/2019 | Castro |
| D871,507 | S | 12/2019 | Urban |
| D872,190 | S | 1/2020 | Zedell, Jr. |
| D877,810 | S | 3/2020 | Nelsom |
| D880,606 | S | 4/2020 | Glenn, II |
| D880,608 | S | 4/2020 | Glenn, II |
| D880,610 | S | 4/2020 | Glenn, II |
| D881,285 | S | 4/2020 | Glenn |
| D882,696 | S | 4/2020 | Lesley |
| D882,697 | S | 4/2020 | Lesley |
| D882,698 | S | 4/2020 | Lesley |
| D884,079 | S | 5/2020 | Glenn, II |
| D889,546 | S | 7/2020 | Jones |
| D890,264 | S | 7/2020 | Johnson |
| D890,265 | S | 7/2020 | Johnson |
| D890,552 | S | 7/2020 | Case |
| D890,790 | S | 7/2020 | Marks |
| D890,849 | S | 7/2020 | Johnson |
| D890,850 | S | 7/2020 | Johnson |
| D893,631 | S | 8/2020 | Glinka |
| D894,285 | S | 8/2020 | Glenn, II |
| D895,019 | S | 9/2020 | Lesley |
| D896,312 | S | 9/2020 | Castro |
| D896,313 | S | 9/2020 | Castro |
| D896,314 | S | 9/2020 | Castro |
| D896,315 | S | 9/2020 | Castro |
| D898,127 | S | 10/2020 | Bristol |
| D898,128 | S | 10/2020 | Urban |
| D902,319 | S | 11/2020 | Hohman |
| D904,522 | S | 12/2020 | Holland |
| D904,915 | S | 12/2020 | Gong |
| D905,172 | S | 12/2020 | Boese |
| D905,730 | S | 12/2020 | Newsom |
| D906,432 | S | 12/2020 | Johnson |
| D906,433 | S | 12/2020 | Abele |

(56) References Cited

U.S. PATENT DOCUMENTS

| | | | |
|---|---|---|---|
| D907,120 | S | 1/2021 | Demarco |
| D907,121 | S | 1/2021 | Demarco |
| D907,122 | S | 1/2021 | Demarco |
| D907,123 | S | 1/2021 | Alexander |
| D907,125 | S | 1/2021 | Abele |
| D907,126 | S | 1/2021 | Abele |
| D907,707 | S | 1/2021 | Demarco |
| D907,708 | S | 1/2021 | Demarco |
| D907,709 | S | 1/2021 | Demarco |
| D907,710 | S | 1/2021 | Demarco |
| D907,711 | S | 1/2021 | Demarco |
| D907,712 | S | 1/2021 | Demarco |
| D907,714 | S | 1/2021 | Alexander |
| D907,715 | S | 1/2021 | Abele |
| D907,716 | S | 1/2021 | Demarco |
| D908,171 | S | 1/2021 | Demarco |
| D908,172 | S | 1/2021 | Demarco |
| D908,173 | S | 1/2021 | Demarco |
| D908,712 | S | 1/2021 | Fischbach |
| D908,802 | S | 1/2021 | Holland |
| D909,399 | S | 2/2021 | La Guardia |
| D909,479 | S | 2/2021 | Abele |
| D910,117 | S | 2/2021 | Demarco |
| D910,118 | S | 2/2021 | Demarco |
| D910,119 | S | 2/2021 | Demarco |
| D910,120 | S | 2/2021 | Demarco |
| D910,761 | S | 2/2021 | Glenn, II |
| D910,762 | S | 2/2021 | Demarco |
| D910,763 | S | 2/2021 | Demarco |
| D911,451 | S | 2/2021 | Ortiz De Viveiros |
| D913,378 | S | 3/2021 | Glenn, II |
| D913,379 | S | 3/2021 | Calhoun |
| D914,808 | S | 3/2021 | Loong |
| D915,523 | S | 4/2021 | Glenn, II |
| D918,300 | S | 5/2021 | Demarco |
| D918,303 | S | 5/2021 | Demarco |
| 11,011,015 | B2 | 5/2021 | Achmueller |
| D923,102 | S | 6/2021 | McGahn |
| 11,132,861 | B2 | 9/2021 | Nelson |
| D934,347 | S | 10/2021 | Ocampo |
| D934,955 | S | 11/2021 | Van Linden |
| D936,150 | S | 11/2021 | Bussey |
| D937,354 | S | 11/2021 | Glenn, II |
| D937,355 | S | 11/2021 | Olive |
| D939,025 | S | 12/2021 | Bruzzese |
| 11,217,059 | B2 | 1/2022 | Onitsuka |
| D943,027 | S | 2/2022 | Ortiz De Viveiros |
| D943,028 | S | 2/2022 | Ortiz de Viveiros et al. |
| D943,029 | S | 2/2022 | Francisco |
| D944,330 | S | 2/2022 | Ortiz De Viveiros |
| D959,562 | S | 2/2022 | Edwards |
| D946,661 | S | 3/2022 | Thompson |
| 11,288,916 | B2 | 3/2022 | Coon |
| D952,751 | S | 5/2022 | Kulujian |
| D952,753 | S | 5/2022 | Kulujian |
| D952,755 | S | 5/2022 | Kulujian |
| 11,348,400 | B2 | 5/2022 | Coon |
| D954,844 | S | 6/2022 | Rosander |
| D954,845 | S | 6/2022 | Johnson |
| D958,888 | S | 7/2022 | Demarco |
| D964,471 | S | 9/2022 | Holland |
| D969,926 | S | 11/2022 | Lewis |
| D969,927 | S | 11/2022 | Lee |
| D969,928 | S | 11/2022 | Lamb |
| D974,472 | S | 1/2023 | Colvin |
| D977,014 | S | 1/2023 | Bussey |
| 2002/0119814 | A1 | 8/2002 | Fong |
| 2002/0183105 | A1 | 12/2002 | Cannon |
| 2004/0048646 | A1 | 3/2004 | Visocnik |
| 2004/0204227 | A1 | 10/2004 | Johnson |
| 2005/0043083 | A1 | 2/2005 | Inoue |
| 2005/0059475 | A1 | 3/2005 | Breen |
| 2005/0215311 | A1 | 9/2005 | Hornik |
| 2005/0282615 | A1 | 12/2005 | Englman |
| 2005/0288094 | A1 | 12/2005 | Marks |
| 2007/0287529 | A1 | 12/2007 | Kojima |
| 2010/0210343 | A1 | 8/2010 | Englman |
| 2011/0207530 | A1 | 8/2011 | Chudek |
| 2013/0116809 | A1 | 5/2013 | Carpenter |
| 2014/0094303 | A1 | 4/2014 | Wabschall |
| 2014/0256409 | A1 | 9/2014 | Wood |
| 2015/0099568 | A1 | 4/2015 | Elias |
| 2016/0086435 | A1 | 3/2016 | Hughes |
| 2016/0092065 | A1 | 3/2016 | Hilbert |
| 2016/0093143 | A1 | 3/2016 | Lamb |
| 2016/0093145 | A1 | 3/2016 | Kitamura |
| 2016/0140795 | A1 | 5/2016 | Fong |
| 2017/0039802 | A1 | 2/2017 | Prabhu |
| 2017/0061743 | A1 | 3/2017 | Itagaki |
| 2017/0092066 | A1 | 3/2017 | Watkins |
| 2017/0221313 | A1 | 8/2017 | Basallo |
| 2018/0040191 | A1 | 2/2018 | Tran |
| 2018/0053373 | A1 | 2/2018 | Goldstein |
| 2018/0075689 | A1 | 3/2018 | Castro |
| 2018/0078854 | A1 | 3/2018 | Achmueller |
| 2018/0190068 | A1 | 7/2018 | Priddy |
| 2018/0330568 | A1 | 11/2018 | Glenn |
| 2018/0342129 | A1 | 11/2018 | Wudtke |
| 2019/0012874 | A1 | 1/2019 | Goldstein |
| 2019/0066445 | A1 | 2/2019 | Satterlie |
| 2019/0096161 | A1 | 3/2019 | Barbour |
| 2019/0096166 | A1 | 3/2019 | Shimizu |
| 2019/0096170 | A1 | 3/2019 | Lewis |
| 2019/0197818 | A1 | 6/2019 | Rosander |
| 2019/0197824 | A1 | 6/2019 | Timperley |
| 2019/0244488 | A1 | 8/2019 | Marsh |
| 2019/0295380 | A1 | 9/2019 | Casey |
| 2020/0111295 | A1 | 4/2020 | Glenn |
| 2020/0111299 | A1 | 4/2020 | Baker |
| 2020/0160654 | A1 | 5/2020 | Idris |
| 2020/0327779 | A1 | 10/2020 | Sanborn |
| 2021/0110642 | A1 | 4/2021 | Ocampo |
| 2021/0134109 | A1 | 5/2021 | Hemerick |
| 2021/0322595 | A1 | 10/2021 | Colvin |
| 2022/0068081 | A1 | 3/2022 | Pariseau |
| 2022/0180695 | A1 | 6/2022 | Fritz |
| 2022/0245993 | A1 | 8/2022 | Soong |
| 2023/0024888 | A1 | 1/2023 | Ocampo |

OTHER PUBLICATIONS

Office Action dated Jul. 6, 2020 for U.S. Appl. No. 16/379,724 (pp. 1-10).

Notice of Allowance dated Nov. 4, 2020 for U.S. Appl. No. 16/379,724 (pp. 1-9).

Office Action dated Oct. 22, 2020 for U.S. Appl. No. 29/686,998 (pp. 1-8).

Notice of Allowance dated Dec. 16, 2020 for U.S. Appl. No. 16/379,724 (pp. 1-2).

Notice of Allowance dated Jan. 25, 2021 for U.S. Appl. No. 29/686,998 (pp. 1-7).

Office Action dated Feb. 23, 2021 for U.S. Appl. No. 29/686,999 (pp. 1-6).

Corrected Notice of Allowability dated Mar. 19, 2021 for U.S. Appl. No. 29/686,998 (pp. 1-2).

Torsani, Derek. "Animated Buffer Logo." Dribbble, published Mar. 31, 2015 (Retrieved from the Internet Feb. 17, 2021). Internet URL: <https://dribbble.com/shots/1998685-Animated-Buffer-Logo> (Year: 2015).

GiVe. "Remerge's CSS loader+ CodePen." Dribbble, published Nov. 24, 2014 (Retrieved from the Internet Feb. 17, 2021). Internet URL: <https://dribbble.com/shots/1821741-Remerge-s-CSS-loader-CodePen> (Year: 2014).

Notice of Allowance dated Apr. 28, 2021 for U.S. Appl. No. 29/686,999 (pp. 1-6).

Office Action (Non-Final Rejection) dated Sep. 27, 2021 for U.S. Appl. No. 17/079,400 (pp. 1-11).

Office Action (Non-Final Rejection) dated Sep. 23, 2021 for U.S. Appl. No. 17/248,251 (pp. 1-12).

MCFM-55-43inch Vertical Type Gaming Machine, first available Jul. 1, 2020, syweb.com [online], site visited Nov. 15, 2021], Available from internet URL: https://bit.ly/3oxvpLu (Year: 2020).

(56) References Cited

OTHER PUBLICATIONS

Infinity V55, first available Apr. 23, 2018, youtube.com [online], site visited Nov. 16, 2021], Available from internet URL: https://www.youtube.com/watch?v=ILy-9J6YkPo (Year: 2018).
Office Action (Final Rejection) dated Jan. 28, 2022 for U.S. Appl. No. 17/079,400 (pp. 1-10).
Office Action (Final Rejection) dated Feb. 24, 2022 for U.S. Appl. No. 17/248,251 (pp. 1-6).
Office Action dated Mar. 23, 2022 for U.S. Appl. No. 29/735,030 (pp. 1-10).
Office Action dated Mar. 23, 2022 for U.S. Appl. No. 29/735,035 (pp. 1-10).
Office Action dated Mar. 17, 2022 for U.S. Appl. No. 29/735,056 (pp. 1-12).
Office Action dated Mar. 23, 2022 for U.S. Appl. No. 29/735,058 (pp. 1-11).
Office Action dated Mar. 17, 2022 for U.S. Appl. No. 29/735,063 (pp. 1-12).
Office Action dated Mar. 23, 2022 for U.S. Appl. No. 29/735,065 (pp. 1-10).
Office Action dated Mar. 17, 2022 for U.S. Appl. No. 29/735,067 (pp. 1-13).
Office Action dated Mar. 17, 2022 for U.S. Appl. No. 29/735,069 (pp. 1-12).
Office Action (Notice of Allowance and Fees Due (PTOL-85) dated Apr. 6, 2022 for U.S. Appl. No. 17/248,251 (pp. 1-8).
Office Action (Notice of Allowance and Fees Due (PTOL-85) dated May 23, 2022 for U.S. Appl. No. 17/248,251 (pp. 1-2).
Office Action (Notice of Allowance and Fees Due (PTOL-85)) dated Jun. 24, 2022 for U.S. Appl. No. 17/079,400 (pp. 1-8).
Office Action dated Aug. 19, 2022 for U.S. Appl. No. 29/735,030 (pp. 1-7).
"Huge new casino and resort opens near Toronto", Aug. 5, 2021, Blogto, site visited Aug. 1, 2022: https://www.blogto.com/city/2021/08/huge-new-casino-and-resort-opens-near-toronto/ (Year: 2021).
"Slot machines" Aug. 11, 2020, Encore Boston Harbor, site visited Aug. 1, 2022: ttps://www.encorebostonharbor.com/casino featured-slot-games (Year: 2020).
"How Do I Pick a Good Slot Machine" Mar. 17, 2020, BestUsCasinos, site visited Aug. 2, 2022: https://www.bestuscasinos.org/ blog/how-do-i-pick-good-slot-machine/ (Year:2020).
Office Action dated Aug. 22, 2022 for U.S. Appl. No. 29/735,035 (pp. 1-7).
Office Action dated Aug. 22, 2022 for U.S. Appl. No. 29/735,056 (pp. 1-8).
Office Action dated Aug. 22, 2022 for U.S. Appl. No. 29/735,058 (pp. 1-8).
Office Action dated Aug. 22, 2022 for U.S. Appl. No. 29/735,063 (pp. 1-7).
Notice of Allowance dated Aug. 26, 2022 for U.S. Appl. No. 29/735,065 (pp. 1-8).
Notice of Allowance dated Aug. 30, 2022 for U.S. Appl. No. 29/735,067 (pp. 1-8).
Notice of Allowance dated Aug. 29, 2022 for U.S. Appl. No. 29/735,069 (pp. 1-8).
Notice of Allowance dated Nov. 15, 2022 for U.S. Appl. No. 29/735,030 (pp. 1-7).
"Winning big bucks", Aug. 4, 2021, Youtube, site visited Nov. 1, 2022: https://www.youtube.com/watch?v=dQeaTYnkCt0 ( Year: 2021).
"Discover the Sumptuous Grand Casino Brussels VIAGE" Nov. 14, 2017, Youtube, site visited Nov. 1, 2022: https:// www.youtube.com/watch?v=LNr5WDi0-rs ( (Year: 2017).
Notice of Allowance dated Nov. 15, 2022 for U.S. Appl. No. 29/735,035 (pp. 1-7).
Notice of Allowance dated Nov. 16, 2022 for U.S. Appl. No. 29/735,056 (pp. 1-7).
Notice of Allowance dated Nov. 16, 2022 for U.S. Appl. No. 29/735,058 (pp. 1-8).
Notice of Allowance dated Nov. 14, 2022 for U.S. Appl. No. 29/735,063 (pp. 1-7).
Notice of Allowance dated May 25, 2023 for U.S. Appl. No. 29/700,719 (pp. 1-19).
Office Action (Non-Final Rejection) dated Oct. 26, 2023 for U.S. Appl. No. 17/978,938 (pp. 1-5).
Office Action (Notice of Allowance and Fees Due (PTOL-85)) dated Dec. 11, 2023 for U.S. Appl. No. 17/978,938 (pp. 1-23).

* cited by examiner

MYSTERY BONUS SYMBOL REVEAL

CROSS-REFERENCE TO RELATED APPLICATIONS

This application is a continuation of, and claims priority to, U.S. patent application Ser. No. 17/248,251, filed on Jan. 15, 2021 and entitled "MYSTERY BONUS SYMBOL REVEAL," which issued as U.S. Pat. No. 11,361,624 and which is a continuation of, and claims priority to, U.S. patent application Ser. No. 16/379,724, filed on Apr. 9, 2019 and entitled "MYSTERY BONUS SYMBOL REVEAL," which issued as U.S. Pat. No. 10,896,578, both of which are hereby incorporated by reference in their entireties and for all purposes. This application is related to U.S. patent application Ser. No. 29/686,998, filed on Apr. 9, 2019, and entitled "DISPLAY SCREEN OR PORTION THEREOF WITH TRANSITIONAL GRAPHICAL USER INTERFACE," which issued as United States Patent No. D917505, and to U.S. patent application Ser. No. 29/686,999, filed on Apr. 9, 2019, and entitled "DISPLAY SCREEN OR PORTION THEREOF WITH TRANSITIONAL GRAPHICAL USER INTERFACE," which issued as United States Patent No. D925598, both of which are hereby incorporated by reference for all purposes.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

At least some aspects of the present disclosure may be implemented via apparatus. For example, one or more devices may be configured for performing, at least in part, the methods disclosed herein. In some implementations, the apparatus may be an electronic gaming device. The electronic gaming device may include a display system that includes one or more displays and a control system that includes one or more processors.

The control system may, for example, be configured for determining which slot symbols will be presented on the display system for an instance of a slot game. The symbols may include one or more mystery symbols and one or more trigger symbols. The control system may be configured for controlling the display system to present first visual effects corresponding to the instance of the game. The first visual effects may include moving symbols and landing of the one or more mystery symbols and the one or more trigger symbols.

The control system may be configured for controlling the display system to present second visual effects corresponding to the one or more mystery symbols. The second visual effects may include a first revealed mystery symbol image corresponding to a first mystery symbol. In some instances, the first revealed mystery symbol image and the one or more trigger symbols, taken together, may correspond to an award of a feature.

The control system may be configured for controlling the display system to present third visual effects corresponding to the feature. According to some implementations, the feature may include a bonus game, a collection item towards winning a jackpot, a collection item towards winning a bonus game, a free game, a base game enhancement, a symbol replacement feature, an expanding reels feature, an improved pay table feature, a "pick until you lose" feature and/or a "pick until you match X" feature, wherein X is an integer.

In some examples, one or more of the mystery symbols may also be a trigger symbol. In some implementations, the first revealed mystery symbol image may match the trigger symbols. According to some examples, presenting the second visual effects may involve presenting images corresponding to opening the first mystery symbol to reveal the first revealed mystery symbol image. In some implementations, the first revealed mystery symbol image may be a smaller version of the first mystery symbol. In some examples, the first mystery symbol may be a treasure chest symbol. In some instances, the first revealed mystery symbol image may not be presented at the time the first visual effects are presented.

In some examples, the control system may be configured for controlling the display system to present images corresponding to opening the first revealed mystery symbol image to reveal a second revealed mystery symbol image. According to some such examples, the second revealed mystery symbol may also be a trigger symbol.

According to some implementations, presenting the first visual effects may involve presenting a second mystery symbol. Presenting the second visual effects may involve presenting images corresponding to a second revealed mystery symbol image corresponding to the second mystery symbol. In some such implementations, the second revealed mystery symbol image may correspond to an award of a credit value. In some instances, the second revealed mystery symbol image may correspond to an award of a jackpot.

In some implementations, the electronic gaming device may include an interface system having one or more user interfaces. The interface system may include one or more network interfaces, one or more interfaces between the control system and a memory system, one or more interfaces between the control system and another device, one or more user interfaces and/or one or more external device interfaces. The control system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. Accordingly, in some implementations the control system may include one or more processors and one or more non-transitory storage media operatively coupled to the one or more processors.

At least some aspects of the present disclosure may be implemented via methods. For example, some such methods may involve determining which slot symbols will be presented on a display system of the electronic gaming device for an instance of a slot game. The symbols may include one or more mystery symbols and one or more trigger symbols. Some such methods may involve controlling the display system to present first visual effects corresponding to the instance of the game. The first visual effects may include moving symbols and landing of the one or more mystery symbols and the one or more trigger symbols.

Some such methods may involve controlling the display system to present second visual effects corresponding to the one or more mystery symbols. The second visual effects may include a first revealed mystery symbol image corresponding to a first mystery symbol. The first revealed mystery symbol image and the one or more trigger symbols, taken together, may correspond to an award of a feature.

Some such methods may involve controlling the display system to present third visual effects corresponding to the feature. According to some implementations, the feature may include a bonus game, a collection item towards winning a jackpot, a collection item towards winning a bonus game, a free game, a base game enhancement, a symbol replacement feature, an expanding reels feature, an improved pay table feature, a “pick until you lose” feature and/or a “pick until you match X” feature, wherein X is an integer.

In some examples, one or more of the mystery symbols may also be a trigger symbol. In some implementations, the first revealed mystery symbol image may match the trigger symbols. According to some examples, presenting the second visual effects may involve presenting images corresponding to opening the first mystery symbol to reveal the first revealed mystery symbol image. In some implementations, the first revealed mystery symbol image may be a smaller version of the first mystery symbol. In some examples, the first mystery symbol may be a treasure chest symbol. In some instances, the first revealed mystery symbol image may not be presented at the time the first visual effects are presented.

According to some implementations, the first visual effects may include one or more wagering images indicating that a wager has been received that is sufficient to enable an award to be triggered. The one or more wagering images may, in some instances, include one or more bet meter images. The award may, for example, correspond to a revealed mystery symbol image.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, various innovative aspects of the subject matter described in this disclosure can be implemented in one or more non-transitory media having software stored thereon. The software may, for example, be executable by one or more components of a control system such as those disclosed herein.

The software may, for example, include instructions for performing one or more of the methods disclosed herein. For example, some such methods may involve determining which slot symbols will be presented on a display system of the electronic gaming device for an instance of a slot game. The symbols may include one or more mystery symbols and one or more trigger symbols. Some such methods may involve controlling the display system to present first visual effects corresponding to the instance of the game. The first visual effects may include moving symbols and landing of the one or more mystery symbols and the one or more trigger symbols.

Some such methods may involve controlling the display system to present second visual effects corresponding to the one or more mystery symbols. The second visual effects may include a first revealed mystery symbol image corresponding to a first mystery symbol. The first revealed mystery symbol image and the one or more trigger symbols, taken together, may correspond to an award of a feature.

Some such methods may involve controlling the display system to present third visual effects corresponding to the feature. According to some implementations, the feature may include a bonus game, a collection item towards winning a jackpot, a collection item towards winning a bonus game, a free game, a base game enhancement, a symbol replacement feature, an expanding reels feature, an improved pay table feature, a “pick until you lose” feature and/or a “pick until you match X” feature, wherein X is an integer.

In some examples, one or more of the mystery symbols may also be a trigger symbol. In some implementations, the first revealed mystery symbol image may match the trigger symbols. According to some examples, presenting the second visual effects may involve presenting images corresponding to opening the first mystery symbol to reveal the first revealed mystery symbol image. In some implementations, the first revealed mystery symbol image may be a smaller version of the first mystery symbol. In some examples, the first mystery symbol may be a treasure chest symbol. In some instances, the first revealed mystery symbol image may not be presented at the time the first visual effects are presented.

According to some implementations, the first visual effects may include one or more wagering images indicating that a wager has been received that is sufficient to enable an award to be triggered. The one or more wagering images may, in some instances, include one or more bet meter images. The award may, for example, correspond to a revealed mystery symbol image.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings generally indicate like elements.

DETAILED DESCRIPTION

Figure 1:
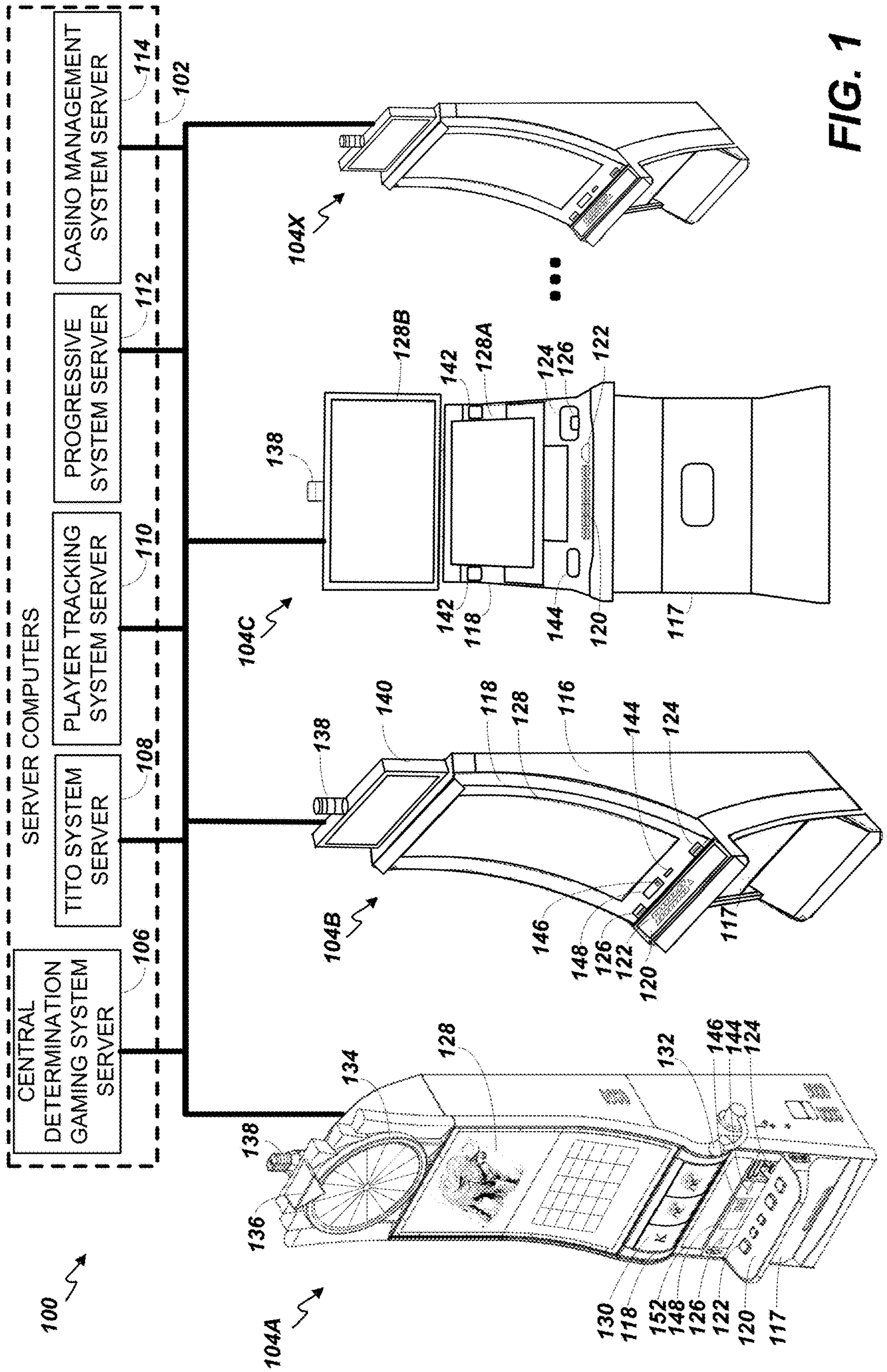
FIG. 1 is a diagram showing examples of several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices. Some examples are described below.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 1048 or any of the other gaming devices 104C-104X. However, it is typical to find multiple EGMs connected to networks implemented with one or more of the different server computers 102 described herein.

Moreover, in some implementations at least some of the EGMs may be "thin-client" or "thick-client" EGMs that are not configured for stand-alone determination of game outcomes, etc. Such client EGMs may be configured for communication with one or more of the different server computers 102 described herein, including but not limited to the central determination gaming system server 106. Some such client EGMs may, for example, be configured to accept tickets and/or cash (e.g., via a bill validator that also functions as a ticket reader) to load credits onto the client EGM, a "ticket-out" printer for outputting a credit ticket when a cash out button is pressed, a player tracking card reader, etc. Some client EGMs may include a transceiver for wireless communication with a player's mobile device, (e.g., for communication with a player's smartphone, tablet and/or mobile gaming device) a keypad 146, and/or an illuminated display 148 for reading, receiving, entering, and/or displaying player tracking information. A client EGM may include a display system, an audio system, etc., for presenting attract sequences, game presentations, etc. The game presentations may include game outcomes determined by another device, such as the central determination gaming system server 106.

The server computers 102 may include a central determination gaming system server 106, a Class II bingo server (not shown), a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 117 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to present or determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor. The main display 128 may be a touchscreen display.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
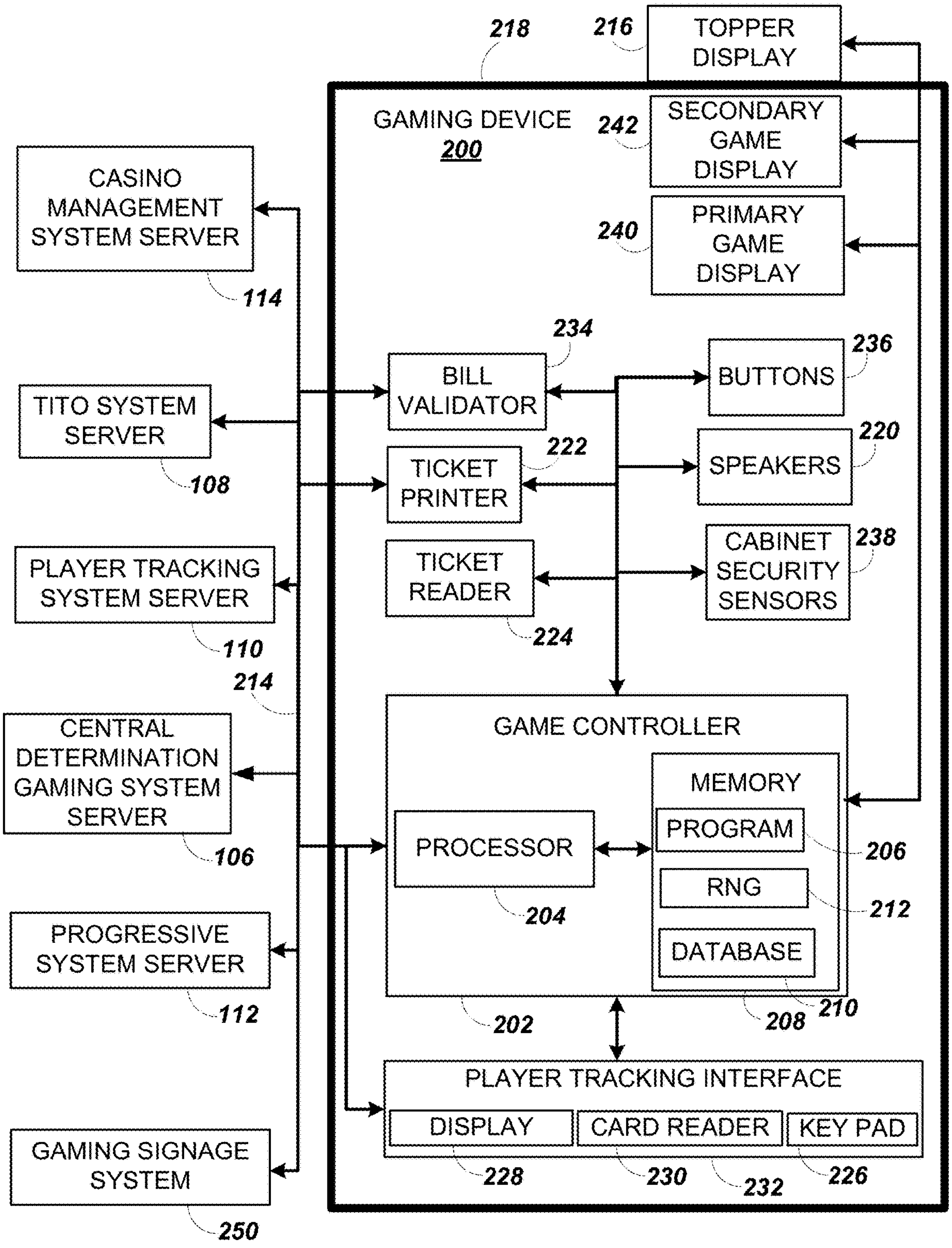
FIG. 2 is a block diagram showing examples of various functional elements of an EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 1048 embodiment using the same reference numbers. Gaming device 1048 does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 1048.

Example gaming device 104B includes a main cabinet 116 including a main door 117 which opens to provide access to the interior of the gaming device 1048. The main or service door 117 is typically used by service personnel to refill the ticket-out printer 126 and collect bills and tickets inserted into the bill validator 124. The door 117 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 1288 is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class II or Class III, etc.

FIG. 2 is a block diagram depicting examples of internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as the central determination gaming system server 106. The game instance may be communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), and a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

In this example, the gaming device 200 is also configured for communication with a gaming signage system 250 via the network 214. Various examples of gaming signage systems 250 are provided herein. According to some examples, the gaming signage system 250 may be configured for communication with other elements of a gaming system via the network 214, such as the central determination gaming system server 106, the progressive system server 112, the player tracking system server 110 the casino management system server 114 and/or the TITO system server 108.

When the player is done, he/she cashes out the credit balance (typically by pressing a cash out button to receive a ticket from the ticket printer 222). The ticket may be redeemed for money or inserted into another machine to establish a credit balance for play.

Figure 3:
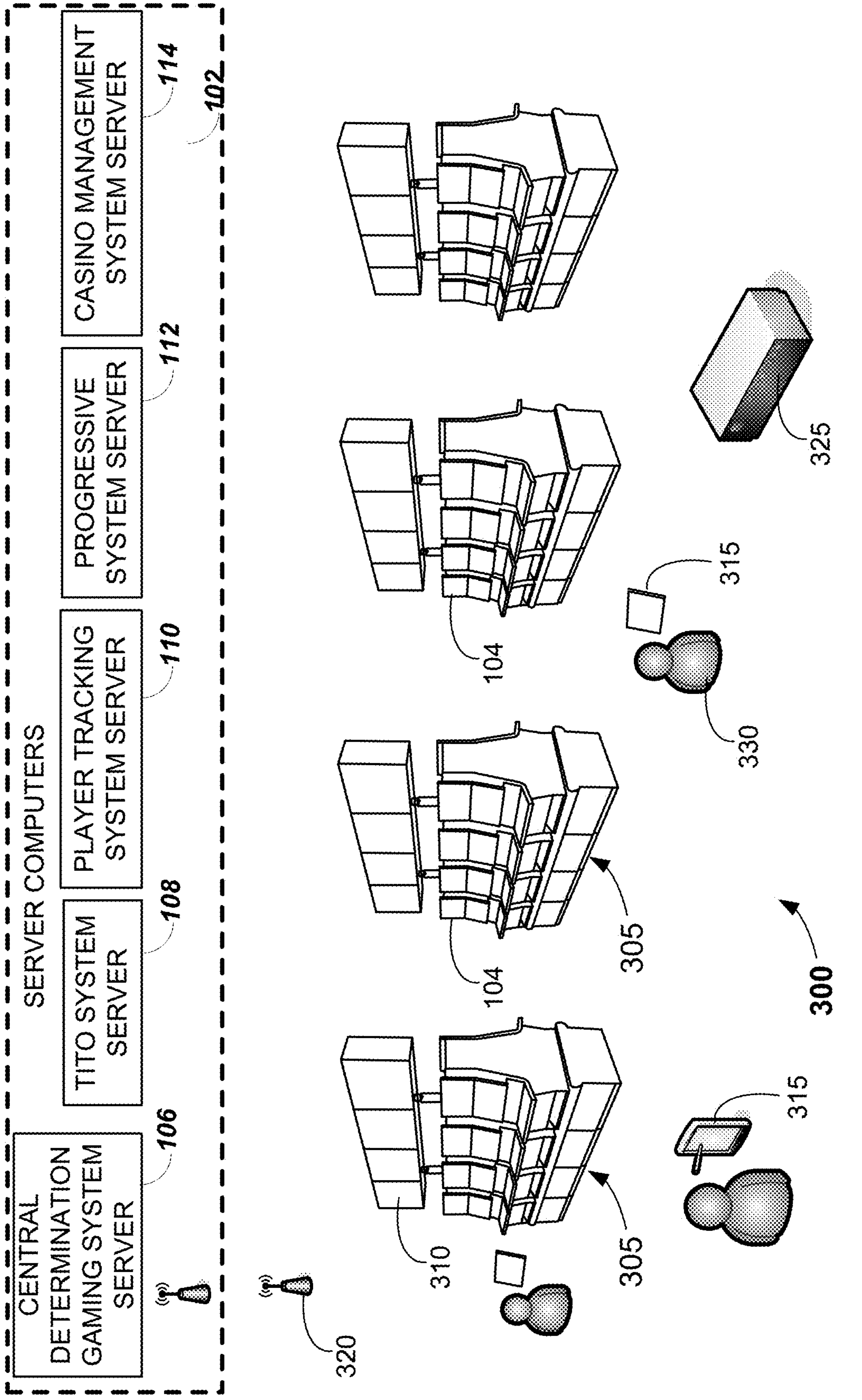
FIG. 3 depicts a casino gaming environment according to one example.

FIG. 3 depicts a casino gaming environment according to one example. In this example, the casino 300 includes banks 305 of EGMs 104. In this example, each bank 305 of EGMs 104 includes a corresponding gaming signage system 310. According to this implementation, the casino 300 also includes mobile gaming devices 315, which are also configured to present wagering games in this example. The mobile gaming devices 315 may, for example, include tablet devices, cellular phones, smart phones and/or other handheld devices. In this example, the mobile gaming devices 315 are configured for communication with one or more other devices in the casino 300, including but not limited to one or more of the server computers 102, via wireless access points 320.

According to some examples, the mobile gaming devices 315 may be configured for stand-alone determination of game outcomes. However, in some alternative implementations the mobile gaming devices 315 may be configured to receive game outcomes from another device, such as the central determination gaming system server 106, one of the EGMs 104, etc.

Some mobile gaming devices 315 may be configured to accept monetary credits from a credit or debit card, via a wireless interface (e.g., via a wireless payment app), via tickets, via a patron casino account, etc. However, some mobile gaming devices 315 may not be configured to accept monetary credits via a credit or debit card. Some mobile gaming devices 315 may include a ticket reader and/or a ticket printer whereas some mobile gaming devices 315 may not, depending on the particular implementation.

In some implementations, the casino 300 may include one or more kiosks 325 that are configured to facilitate monetary transactions involving the mobile gaming devices 315, which may include cash out and/or cash in transactions. The kiosks 325 may be configured for wired and/or wireless communication with the mobile gaming devices 315. The kiosks 325 may be configured to accept monetary credits from casino patrons 330 and/or to dispense monetary credits to casino patrons 330 via cash, a credit or debit card, via a wireless interface (e.g., via a wireless payment app), via tickets, etc. According to some examples, the kiosks 325 may be configured to accept monetary credits from a casino patron and to provide a corresponding amount of monetary credits to a mobile gaming device 315 for wagering purposes, e.g., via a wireless link such as a near-field communications link. In some such examples, when a casino patron 330 is ready to cash out, the casino patron 330 may select a cash out option provided by a mobile gaming device 315, which may include a real button or a virtual button (e.g., a button provided via a graphical user interface) in some instances. In some such examples, the mobile gaming device 315 may send a "cash out" signal to a kiosk 325 via a wireless link in response to receiving a "cash out" indication from a casino patron. The kiosk 325 may provide monetary credits to the patron 330 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 315 and/or a kiosk 325.

Some mobile gaming devices 315 may be configured for receiving and/or transmitting player loyalty information. For example, some mobile gaming devices 315 may be configured for wireless communication with the player tracking system server 110. Some mobile gaming devices 315 may be configured for receiving and/or transmitting player loyalty information via wireless communication with a patron's player loyalty card, a patron's smartphone, etc.

According to some implementations, a mobile gaming device 315 may be configured to provide safeguards that prevent the mobile gaming device 315 from being used by an unauthorized person. For example, some mobile gaming devices 315 may include one or more biometric sensors and may be configured to receive input via the biometric sensor(s) to verify the identity of an authorized patron. Some mobile gaming devices 315 may be configured to function only within a predetermined or configurable area, such as a casino gaming area.

Figure 4:
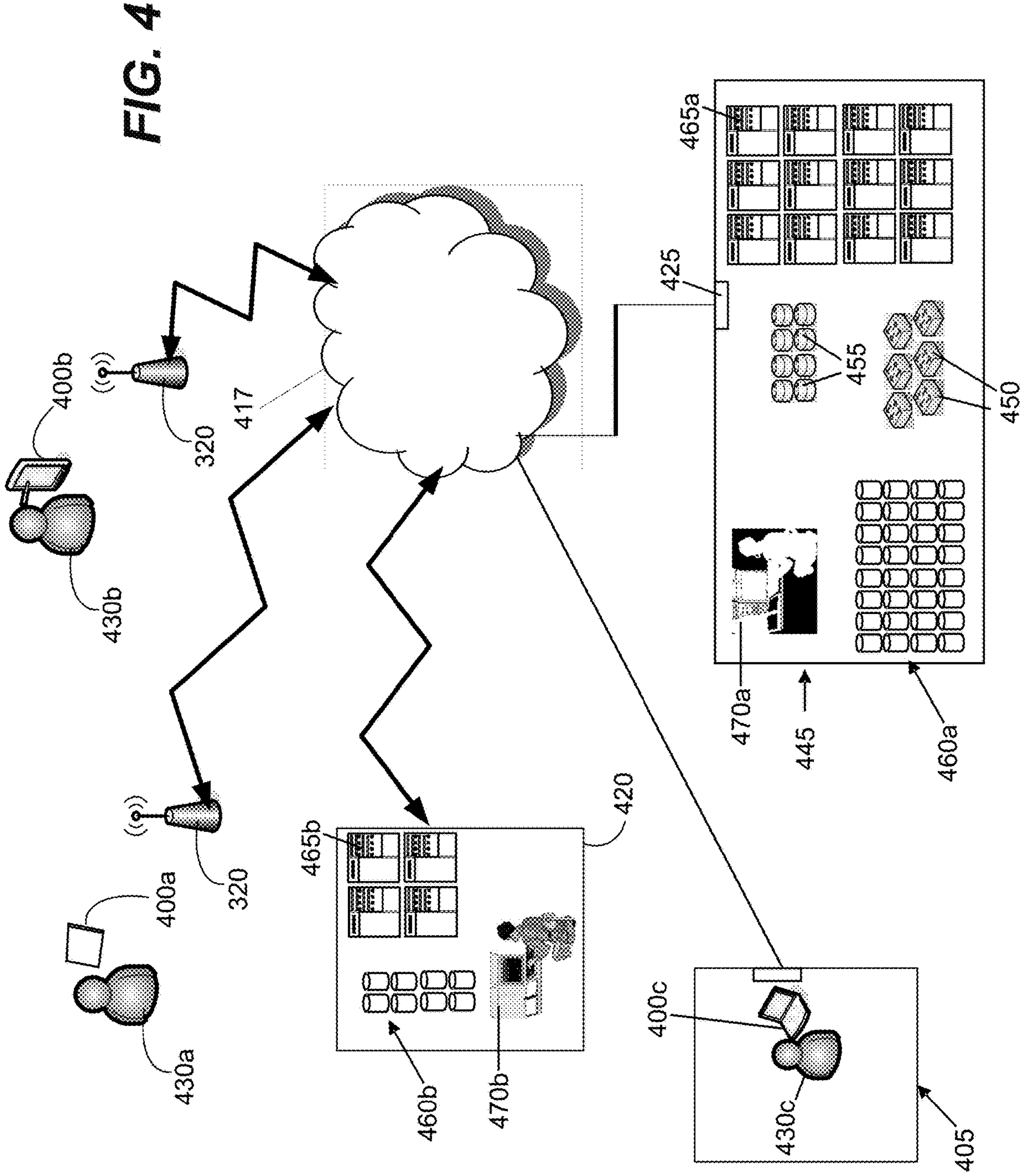
FIG. 4 is a diagram that shows examples of components of a system for providing online gaming according to some aspects of the present disclosure.

FIG. 4 is a diagram that shows examples of components of a system for providing online gaming according to some aspects of the present disclosure. As with other figures presented in this disclosure, the numbers, types and arrangements of gaming devices shown in FIG. 4 are merely shown by way of example. In this example, various gaming devices, including but not limited to end user devices (EUDs) 400*a*, 400*b* and 400*c* are capable of communication via one or more networks 417. The networks 417 may, for example, include one or more cellular telephone networks, the Internet, etc. In this example, the EUDs 400*a* and 400*b* are mobile devices: according to this example the EUD 400*a* is a tablet device and the EUD 400*b* is a smart phone. In this implementation, the EUD 400*c* is a laptop computer that is located within a residence 405 at the time depicted in FIG. 4. Accordingly, in this example the hardware of EUDs is not specifically configured for online gaming, although each EUD is configured with software for online gaming. Other implementations may include other types of EUD, some of which may be specifically configured for online gaming.

In this example, a gaming data center 445 includes various devices that are configured to provide online wagering games via the networks 417. The gaming data center 445 is capable of communication with the networks 417 via the gateway 425. In this example, switches 450 and routers 455 are configured to provide network connectivity for devices of the gaming data center 445, including storage devices 460*a*, servers 465*a* and one or more workstations 570*a*. The servers 465*a* may, for example, be configured to provide access to a library of games for online game play. In some examples, code for executing at least some of the games may initially be stored on one or more of the storage devices 460*a*. The code may be subsequently loaded onto a server 465*a* after selection by a player via an EUD and communication of that selection from the EUD via the networks 417. The server 465*a* onto which code for the selected game has been loaded may provide the game according to selections made by a player and indicated via the player's EUD. In other examples, code for executing at least some of the games may initially be stored on one or more of the servers 465*a*. Although only one gaming data center 445 is shown in FIG. 4, some implementations may include multiple gaming data centers 445.

In this example, a financial institution data center 420 is also configured for communication via the networks 417. Here, the financial institution data center 420 includes servers 465*b*, storage devices 460*b*, and one or more workstations 470*b*. According to this example, the financial institution data center 420 is configured to maintain financial accounts, such as checking accounts, savings accounts, loan accounts, etc. In some implementations one or more of the authorized users 430*a*-430*c* may maintain at least one financial account with the financial institution that is serviced via the financial institution data center 420.

According to some implementations, the gaming data center 445 may be configured to provide online wagering games in which money may be won or lost. According to some such implementations, one or more of the servers 465*a* may be configured to monitor player credit balances, which may be expressed in game credits, in currency units, or in any other appropriate manner. In some implementations, the server(s) 465*a* may be configured to obtain financial credits from and/or provide financial credits to one or more financial institutions, according to a player's "cash in" selections, wagering game results and a player's "cash out" instructions. According to some such implementations, the server(s) 465*a* may be configured to electronically credit or debit the account of a player that is maintained by a financial institution, e.g., an account that is maintained via the financial institution data center 420. The server(s) 465*a* may, in some examples, be configured to maintain an audit record of such transactions.

In some alternative implementations, the gaming data center 445 may be configured to provide online wagering games for which credits may not be exchanged for cash or the equivalent. In some such examples, players may purchase game credits for online game play, but may not "cash out" for monetary credit after a gaming session. Moreover, although the financial institution data center 420 and the gaming data center 445 include their own servers and storage devices in this example, in some examples the financial institution data center 420 and/or the gaming data center 445 may use offsite "cloud-based" servers and/or storage devices. In some alternative examples, the financial institution data center 420 and/or the gaming data center 445 may rely entirely on cloud-based servers.

One or more types of devices in the gaming data center 445 (or elsewhere) may be capable of executing middleware, e.g., for data management and/or device communication. Authentication information, player tracking information, etc., including but not limited to information obtained by EUDs 400 and/or other information regarding authorized users of EUDs 400 (including but not limited to the authorized users 430*a*-430*c*), may be stored on storage devices 460 and/or servers 465. Other game-related information and/or software, such as information and/or software relating to leaderboards, players currently playing a game, game themes, game-related promotions, game competitions, etc., also may be stored on storage devices 460 and/or servers 465. In some implementations, some such game-related software may be available as "apps" and may be downloadable (e.g., from the gaming data center 445) by authorized users.

In some examples, authorized users and/or entities (such as representatives of gaming regulatory authorities) may obtain gaming-related information via the gaming data center 445. One or more other devices (such EUDs 400 or devices of the gaming data center 445) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Some slot games involve what is sometimes referred to as a "mystery symbol." In some examples, a mystery symbol may be a slot symbol that is not used for evaluating potentially winning combinations of symbols, e.g., across a pay line. In some examples, the mystery symbol may change from one type of symbol that is first presented on a display to one of several other possible types of symbols that are subsequently presented in the same location of the display. The other types of symbols that are subsequently presented may, in some implementations, be standard slot symbols. Accordingly, in some such examples the mystery symbol acts as a place holder until another symbol is presented to a player. In some examples, the other symbol may be selected from the entire set of available symbols for a particular game theme, whereas in other examples the other symbol may be selected from a subset of available symbols.

Players like some aspects of existing wagering games that involve mystery symbols. For example, some players may feel additional excitement when waiting for the other symbol to be revealed. Some players may perceive the transformation of a mystery symbol to another symbol as being similar to the process of opening a wrapped present. Accordingly, existing wagering games that involve one or more mystery symbols can provide benefits both to players and to casinos.

However, some players find other aspects of existing wagering games that involve mystery symbols to be less than optimal. For example, if a predetermined number of symbols (e.g., three scatter symbols) are required to trigger a feature, landing two scatter symbols is considered a "near miss." In some existing wagering games, a mystery symbol cannot reveal, or transform into, a scatter symbol. Even in those instances in which a mystery symbol can reveal, or transform into, a scatter symbol, a "near miss" may still occur.

Particular aspects of the subject matter described in this disclosure can be implemented to realize one or more of the following potential advantages. According to some examples, at least one mystery symbol and at least one trigger symbol may be presented during a game presentation. In some implementations, a mystery symbol animation may show the mystery symbol open and may present a revealed mystery symbol image. The revealed mystery symbol image and the one or more trigger symbols, taken together, may correspond to an award of a feature. For example, if three trigger symbols would otherwise need to land in order to trigger a feature, according to some implementations if only two trigger symbols land, the revealed mystery symbol image could be the third required symbol for triggering the feature. In some examples, the revealed mystery symbol image may match the trigger symbols.

Such implementations may enhance player excitement. For example, after all of the symbols have landed, enough trigger symbols for a feature presentation may not have landed. However, if one or more mystery symbols have landed, a player may still have a chance for the feature to be triggered. For example, a combination of landed symbols that at first appeared to be a "near miss" could still possibly trigger a feature after a revealed mystery symbol image is shown. Until the player sees the results of the mystery symbol animation(s), the player may feel suspense and a keen sense of anticipation. Even if a feature is not triggered, in some examples a revealed mystery symbol image may correspond with a credit award or a jackpot award.

Figure 5:
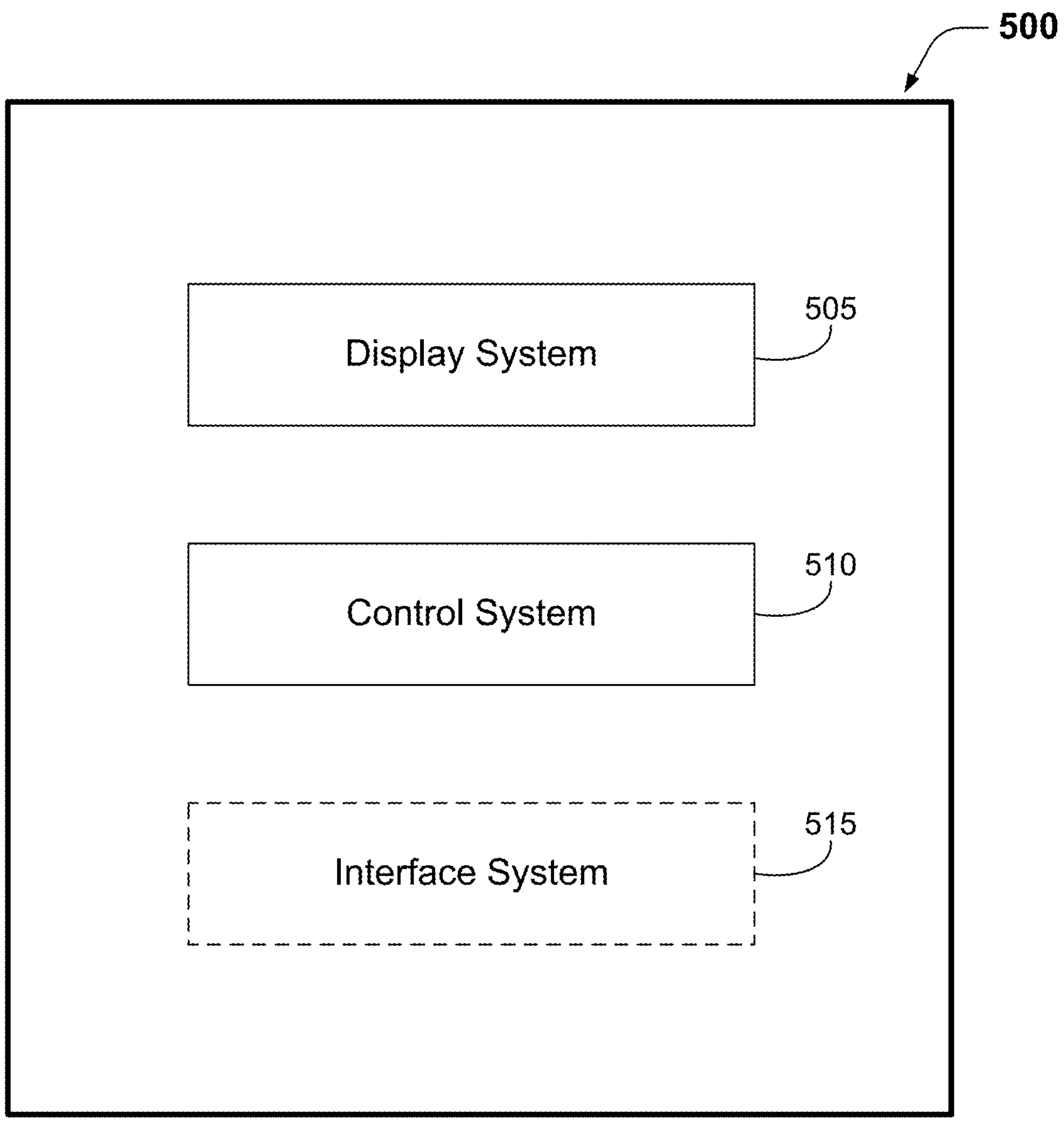
FIG. 5 is a block diagram that shows blocks of an apparatus according to one example.

FIG. 5 is a block diagram that shows blocks of an apparatus according to one example. According to some examples, the apparatus 500 may be, or may include, an electronic gaming device. In some examples, the electronic gaming device may be an EGM such as those described above with reference to FIGS. 1 and 2. However, in alternative examples, the electronic gaming device may be a mobile device such as described above with reference to FIG. 3 or an EUD as described above with reference to FIG. 4.

In this example, the apparatus 500 includes a display system 505 and a control system 510 that is configured to communicate with the display system 505. In this example, the control system 510 is configured to communicate with the display system 505 via wired communication, e.g., via electrical signals. In alternative implementations, the control system 510 may be configured to communicate with the display system 505 via wireless communication. Accordingly, at least a portion of the control system 510 may be coupled to the display system 505. As used herein, the term "coupled to" has a meaning that could include being physically coupled for wired communication or being configured for wireless communication.

The control system 510 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

The control system 510 also may include (and/or be configured for communication with) one or more memory devices, such as one or more random access memory (RAM) devices, read-only memory (ROM) devices and/or other types of non-transitory media. In some implementations, at least a portion of the control system 510 may be implemented as a register. Accordingly, the apparatus 500 may have a memory system that includes one or more memory devices, though the memory system is not shown in FIG. 5.

The control system 510 may be capable of performing, at least in part, the methods disclosed herein. In some examples, the control system 510 may be capable of performing at least some of the methods described herein according to instructions (e.g., software) stored on non-transitory media. For example, the control system 510 may be configured for controlling the display system 505 and/or for receiving and processing data from at least a portion of the interface system 515, e.g., as described below.

The display system 505 may include, one or more liquid crystal displays (LCDs), plasma displays, light-emitting diode (LED) displays, microLED displays or organic light-emitting diode (OLED) displays. According to some implementations, the display system 505 may include at least one flexible display, such as a flexible OLED. Although shown as separate components in FIG. 5, the display system 505 may, in some examples, include at least a portion of the control system 510. For example, the display system 505 may include one or more processors, microprocessors, programmable logic devices, discrete gates or transistor logic, etc.

In the example shown in FIG. 5, the apparatus 500 includes an interface system 515. In some examples, the interface system 515 may include a wireless interface system. In some implementations, the interface system 515 may include a network interface, an interface between the control system 510 and the display system 505, an interface between the control system 510 and a memory system and/or an interface between the control system 510 and an external device interface (e.g., a port or an applications processor). In some examples, the interface system 515 may include one or more user interfaces, such as a touch screen, one or more buttons, a gesture recognition system, a voice recognition system, etc.

Although the interface system 515 is shown as being separate from the control system 510, in some implementations the interface system 515 may be part of the control system 510. In some implementations, the interface system 515 may include the entire control system 510.

According to some implementations, the apparatus 500 may be a single device, whereas in other implementations the apparatus 500 may be a system that includes more than one device. Accordingly, the terms "apparatus" and "system" may sometimes be used interchangeably herein. In other examples, the apparatus 500 may be a component of another device. For example, in some implementations at least a portion of the display system 505 and/or the control system 510 may be included in more than one apparatus. For example, in some implementations at least part of the control system 510 may reside in a server, such as a central determination server, a server that tracks feature award credits, etc.

Figure 6:
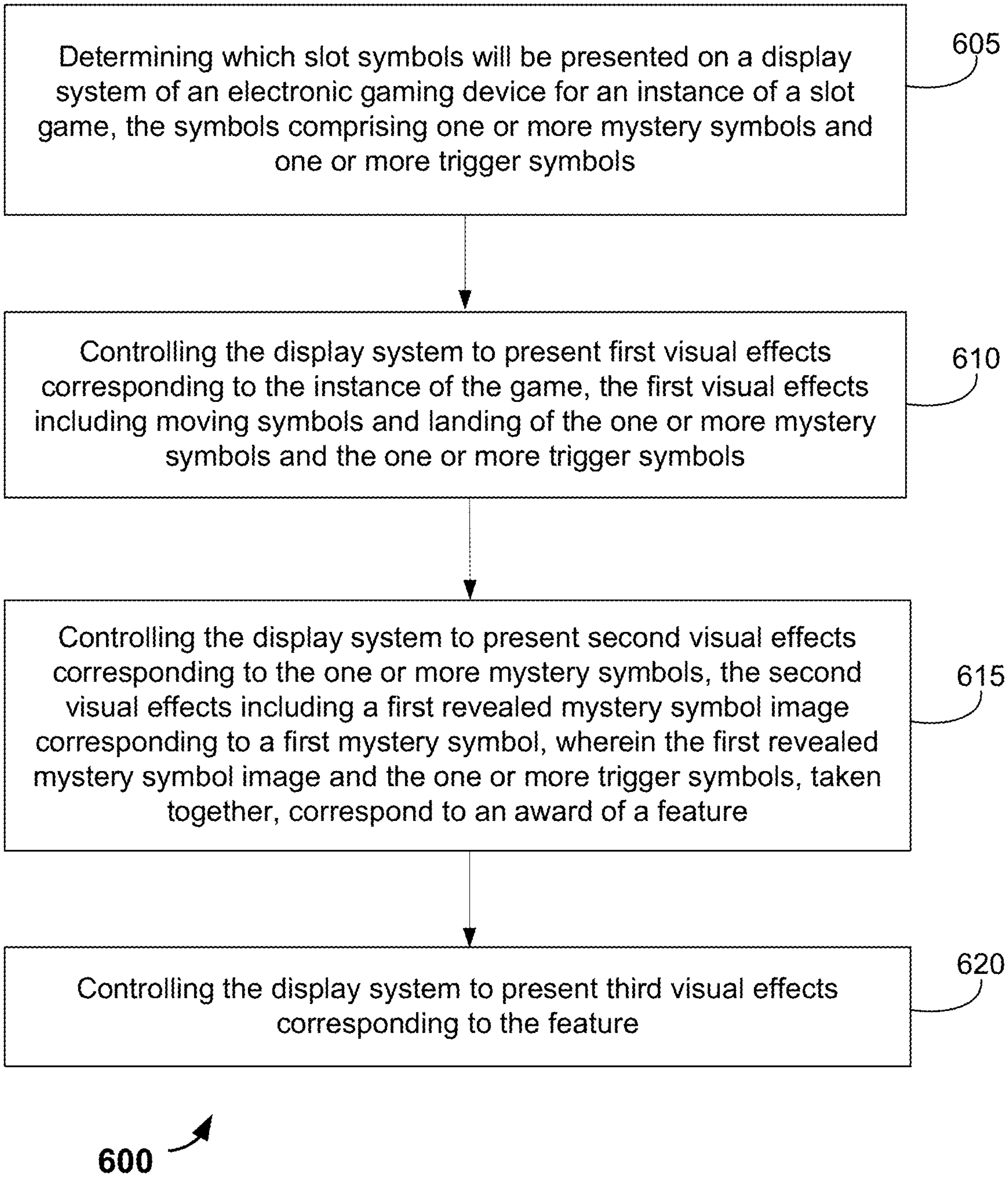
FIG. 6 is a flow diagram that shows blocks of a method according to one example.

FIG. 6 is a flow diagram that shows blocks of a method according to one example. In some examples method 600 may be performed, at least in part, by an apparatus such as that described above with reference to FIG. 5. In some examples, the method 600 may be performed by a control system (e.g., the control system 510 of FIG. 5) according to software stored upon one or more non-transitory storage media. As with other methods described herein, the number and sequence of blocks shown in FIG. 6 are merely examples. Similar disclosed methods may include more or fewer blocks. Moreover, at least some of the blocks may occur in a different sequence than the sequence that is shown in a flow diagram.

According to this example, block 605 involves determining which slot symbols will be presented on a display system of an electronic gaming device for an instance of a slot game. In this example, the symbols include one or more mystery symbols and one or more trigger symbols. In some instances, the game may be a base game and in other instances the game may be a bonus game. The type of slot game may vary according to the particular implementation.

The determination process of block 605 may be performed, at least in part, by a control system of the electronic gaming device that is presenting the instance of the slot game. However, the determination process of block 605 may vary, depending on the particular implementation. In some examples, the determination process of block 605 may be an independent process that is primarily, or entirely, performed by the control system of the electronic gaming device. For example, the control system may be configured for generating a random or pseudorandom number that corresponds with the determination process of block 605. In alternative implementations, the determination process of block 605 may involve receiving game instance information from another device, such as a server. Block 605 may, for example, involve receiving the game instance information via an interface system. According to some examples, the game instance information may be based on a random or pseudorandom number that is determined by another device, such as a server. In some such examples, the determination process of block 605 may involve receiving a random or pseudorandom number from the other device.

In this example, block 610 involves controlling the display system to present first visual effects corresponding to the instance of the game. Block 610 may, for example, involve controlling the display system via the control system of the electronic gaming device. In this example, the first visual effects include images of moving symbols and images of landing the one or more mystery symbols and the one or more trigger symbols. Some examples of mystery symbols are shown in FIGS. 7-16 and are described below. According to some disclosed implementations, a mystery symbol may also be a trigger symbol. However, these examples are in no way limiting; other implementations may involve other types of mystery symbols and/or trigger symbols. For example, according to some implementations a mystery symbol may be different from a trigger symbol.

According to this example, block 615 involves controlling the display system to present second visual effects corresponding to the one or more mystery symbols. In this implementation, the second visual effects include a first revealed mystery symbol image corresponding to a first mystery symbol. According to some examples, presenting the second visual effects may involve presenting images corresponding to opening the first mystery symbol to reveal the first revealed mystery symbol image. In some examples, the first revealed mystery symbol image is not presented at the time the first visual effects are initially presented.

In this example, the first revealed mystery symbol image and the one or more trigger symbols, taken together, correspond to an award of a feature. For example, if three trigger symbols would otherwise need to land in order to trigger a feature, according to some implementations if only two trigger symbols land, the revealed mystery symbol image may be the third required symbol for triggering the feature. If four trigger symbols would otherwise need to land in order to trigger a feature, according to some implementations if only three trigger symbols land, the revealed mystery symbol image may be the fourth required symbol for triggering the feature.

In some examples, the revealed mystery symbol image may match the trigger symbols. For example, the revealed mystery symbol image may be a smaller or larger version of the trigger symbols, or may be the same size as the trigger symbols.

According to this example, block 620 involves controlling the display system to present third visual effects corresponding to the feature. In some implementations, the feature may be, or may include, one or more bonus games. According to some such examples, the bonus game may include one or more wheel-based bonus games. According to some implementations, the feature may be, or may include, one or more free games. In some examples the feature may be, or may include, a collection item towards winning a jackpot or a collection item towards winning a free game, a bonus game, or a round of bonus games. For example, the feature may involve awarding one or more collection items, but not enough collection items for the award of a free game, a jackpot, a bonus game or a round of bonus games.

In some implementations, the feature may be, or may include, one or more base game enhancements. The base game enhancement(s) may, for example, include additional wild symbols and/or multiplier symbols. In some examples, the base game enhancement(s) may include what are sometimes referred to as "expanding wild symbols." Expanding wild symbols may, for example, expand over the length of a slot reel from top to bottom, making every symbol on the reel wild. Such expansion may potentially generate several wins over several paylines. In some instances, the base game enhancement(s) may include an additional reel for the next one or more instances of the base game. In some examples, the base game enhancement(s) may include an enhanced pay table for the next one or more instances of the base game. In some implementations, the feature may be, or may include, a "pick until you match X" feature (where X is an integer), a pick until you lose feature, a cascading symbol feature, a symbol replacement feature and/or an expanding reels feature. Alternative implementations may provide other types of features.

In some implementations blocks 610 and 615 may involve controlling the display system to present second visual effects corresponding to more than one mystery symbol and more than one revealed mystery symbol image. According to some such implementations, a first revealed mystery symbol image, a second revealed mystery symbol image and one or more trigger symbols, taken together, correspond to an award of a feature.

Alternatively, or additionally, in some instances a first revealed mystery symbol image or a second revealed mystery symbol image may correspond to an award of a credit value. According to some examples, a first revealed mystery symbol image or a second revealed mystery symbol image may correspond to an award of a jackpot.

Figure 7:
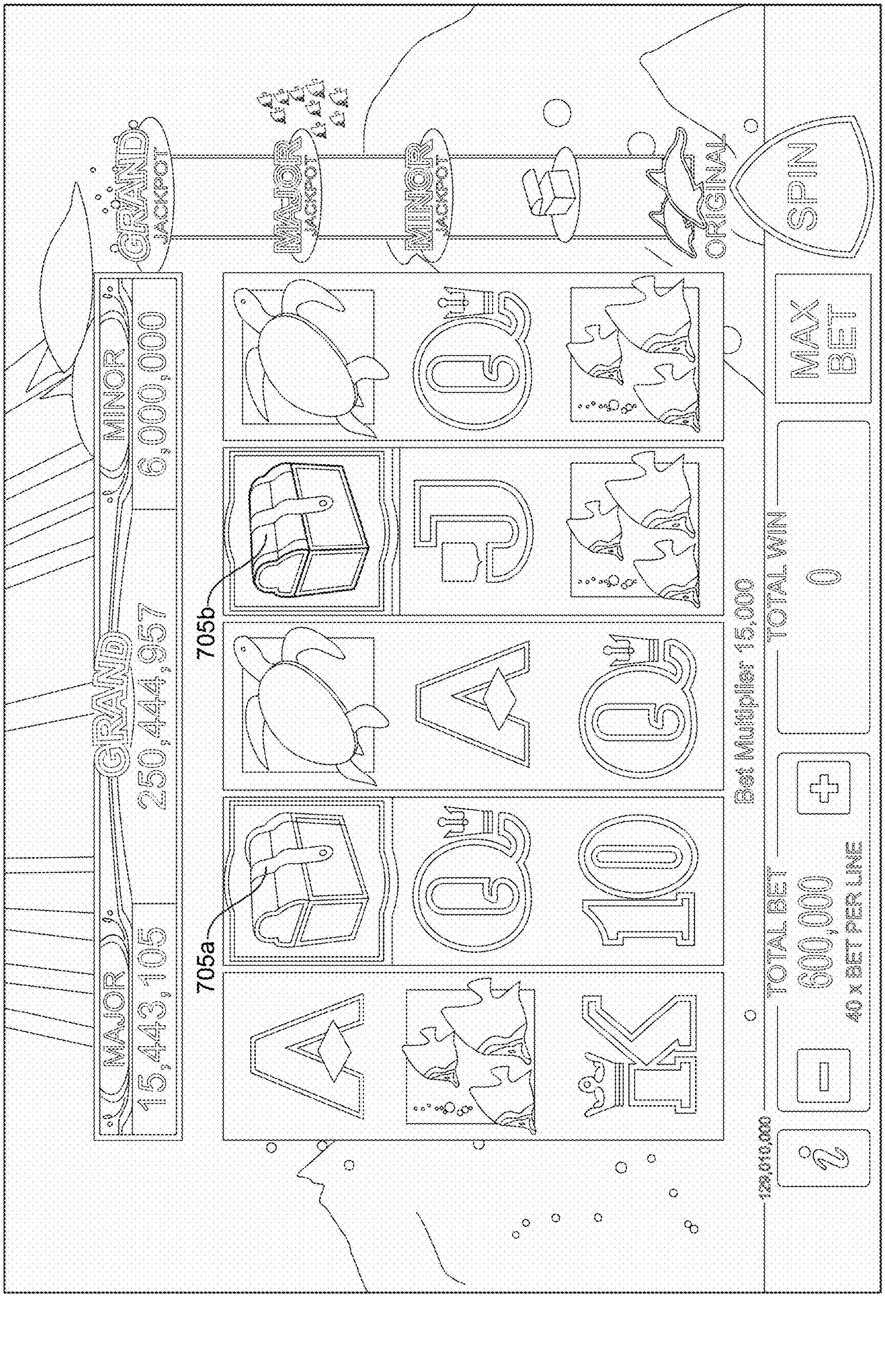
FIG. 7 shows an example of visual effects that may be presented on a display of an electronic gaming device according to some examples.

FIG. 7 shows an example of visual effects that may be presented on a display of an electronic gaming device according to some examples. The visual effects depicted in FIG. 7 correspond with visual effects that may be presented according to one example of block 610 of FIG. 6. In this example, the mystery symbols 705*a* and 705*b* are treasure chest symbols. According to this implementation, the mystery symbols 705*a* and 705*b* are also trigger symbols. In this example, if three treasure chest symbols land a feature is triggered. However, in the example shown in FIG. 7 only two of the required treasure chest symbols have landed. Nonetheless, a player may still have a chance for the feature to be triggered. In this example, until the player sees the results of mystery symbol animation(s) corresponding to the mystery symbols 705*a* and 705*b*, the player does not know whether a feature will be triggered and/or another award will be granted.

Figure 8:
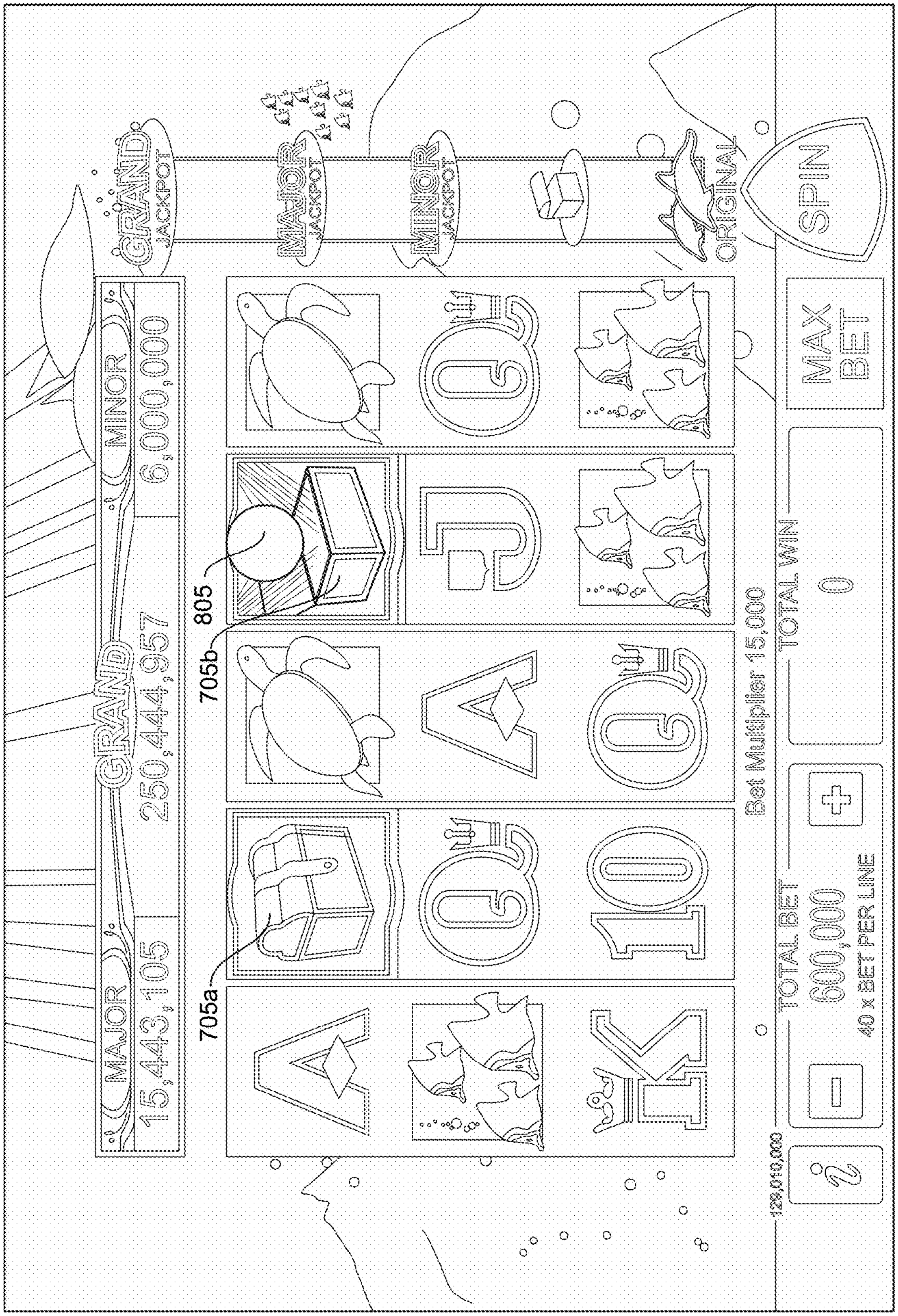
FIG. 8 shows one aspect of a mystery symbol animation that may be presented on a display of an electronic gaming device according to some implementations.

FIG. 8 shows one aspect of a mystery symbol animation that may be presented on a display of an electronic gaming device according to some implementations. In this example, FIG. 8 shows an example of an image that may be presented after FIG. 7 is presented. For example, FIG. 8 shows an example of an image that may be presented during block 615 of FIG. 6, or during a time between that represented by block 610 and a time represented by block 615. According to this example, the mystery symbol 705*b* has opened and a bubble 805 has floated out of the mystery symbol 705*b*.

Figure 9:
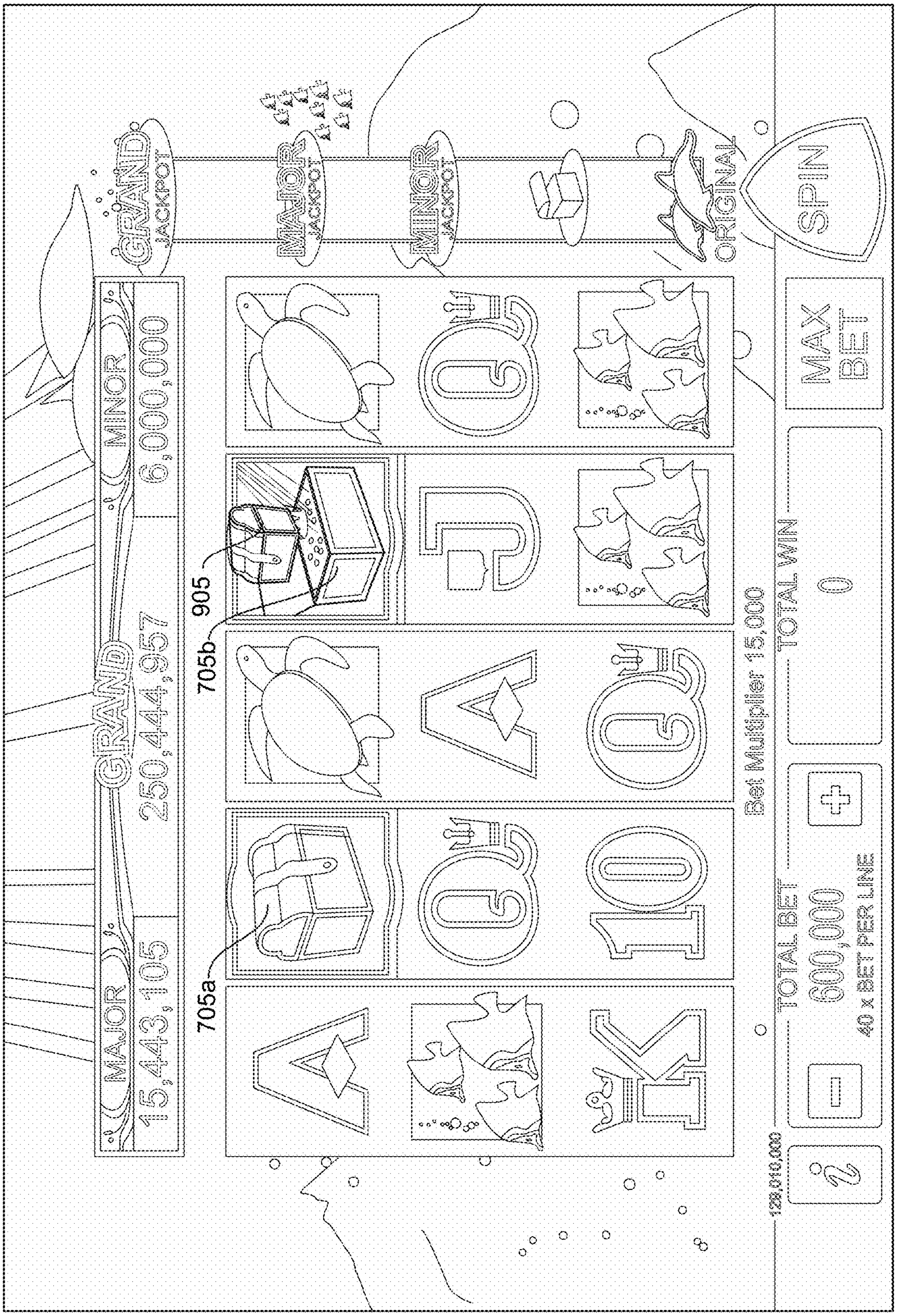
FIG. 9 shows another aspect of a mystery symbol animation that may be presented on a display of an electronic gaming device according to some implementations.

FIG. 9 shows another aspect of a mystery symbol animation that may be presented on a display of an electronic gaming device according to some implementations. In this example, FIG. 9 shows an example of an image that may be presented after FIG. 8 is presented. FIG. 9 shows an example of an image that may be presented during block 615 of FIG. 6. According to this example, the previously-displayed bubble 805 has burst and the revealed mystery symbol image 905 is being presented. In this instance, the revealed mystery symbol image 905 is another treasure chest symbol. Accordingly, the revealed mystery symbol image 905 matches the mystery symbols 705*a* and 705*b*, which are treasure chest symbols and are also trigger symbols. In this example, the revealed mystery symbol image 905 and the other trigger symbols, taken together, correspond to an award of a feature. According to some examples, visual effects corresponding to the feature (the "third visual effects" of block 620) may subsequently be presented.

According to some implementations, a control system may cause a display of an electronic gaming device to present a sequence of images indicating that the revealed mystery symbol image 905 opens to reveal a second revealed mystery symbol image. In some instances, the revealed mystery symbol image 905, the second revealed mystery symbol image and the other trigger symbols (if any), taken together, may correspond to an award of a feature. In some such examples, the second revealed mystery symbol image may be, or may include, a trigger symbol. In some such implementations, a control system may cause the display to present a sequence of images indicating that the second revealed mystery symbol image opens to reveal a third revealed mystery symbol image. In some such examples, the third revealed mystery symbol image may be, or may include, a trigger symbol. In some instances, the revealed mystery symbol image 905, the second revealed mystery symbol image, the third revealed mystery symbol image and the other trigger symbols (if any), taken together, may correspond to an award of a feature.

In some instances, a mystery symbol may not have a corresponding revealed mystery symbol image. For example, in some instances the mystery symbol 705*a* may not have a corresponding revealed mystery symbol image. According to some such examples, a mystery symbol animation may still be presented on a display device even if a mystery symbol does not have a corresponding revealed mystery symbol image. For example, in some implementations a mystery symbol animation may be presented for the mystery symbol 705*a* even when the mystery symbol 705*a* does not have a corresponding revealed mystery symbol image. The mystery symbol animation may, for example, depict the mystery symbol 705*a* moving, but not opening.

Figure 10:
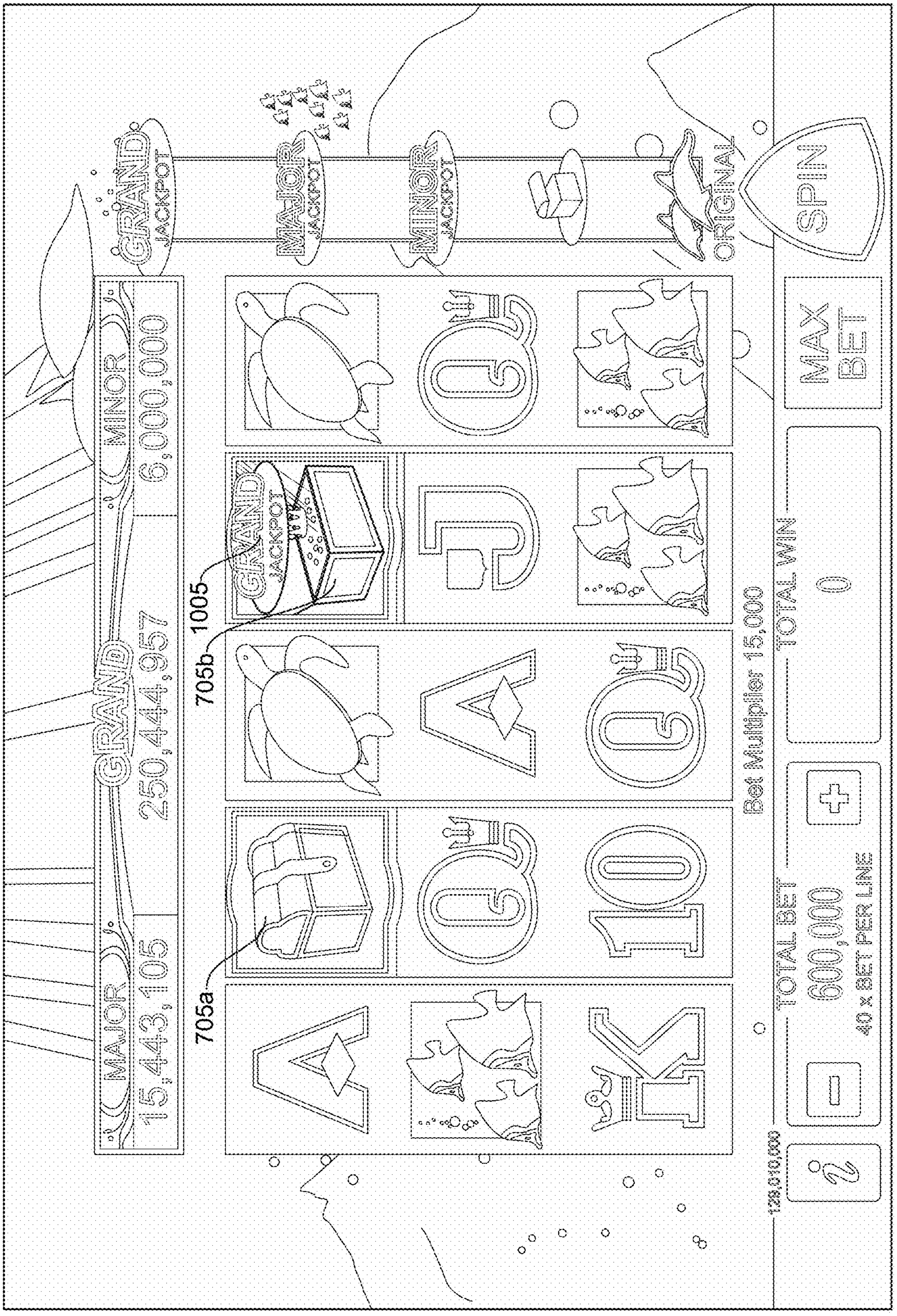
FIG. 10 shows an alternative aspect of a mystery symbol animation that may be presented on a display of an electronic gaming device according to some implementations.

FIG. 10 shows an alternative aspect of a mystery symbol animation that may be presented on a display of an electronic gaming device according to some implementations. In this example, FIG. 10 shows an example of an image that may be presented after FIG. 8 is presented. According to this example, the previously-displayed bubble 805 has burst and the revealed mystery symbol image 1005 is being presented. In this instance, the revealed mystery symbol image 1005 corresponds to an award of the grand jackpot. Visual effects corresponding to the award of the grand jackpot may subsequently be presented.

Although the revealed mystery symbol image 1005 corresponds with, and is shown to emerge from, the mystery symbol 705*b* in this example, in some alternative examples the revealed mystery symbol image 1005 may correspond with the mystery symbol 705*a*. According to some such examples, the revealed mystery symbol image 905 may be shown to emerge from the mystery symbol 705*b* or from another mystery symbol. In such instances, a jackpot may be awarded and a feature may be triggered.

Figure 11:
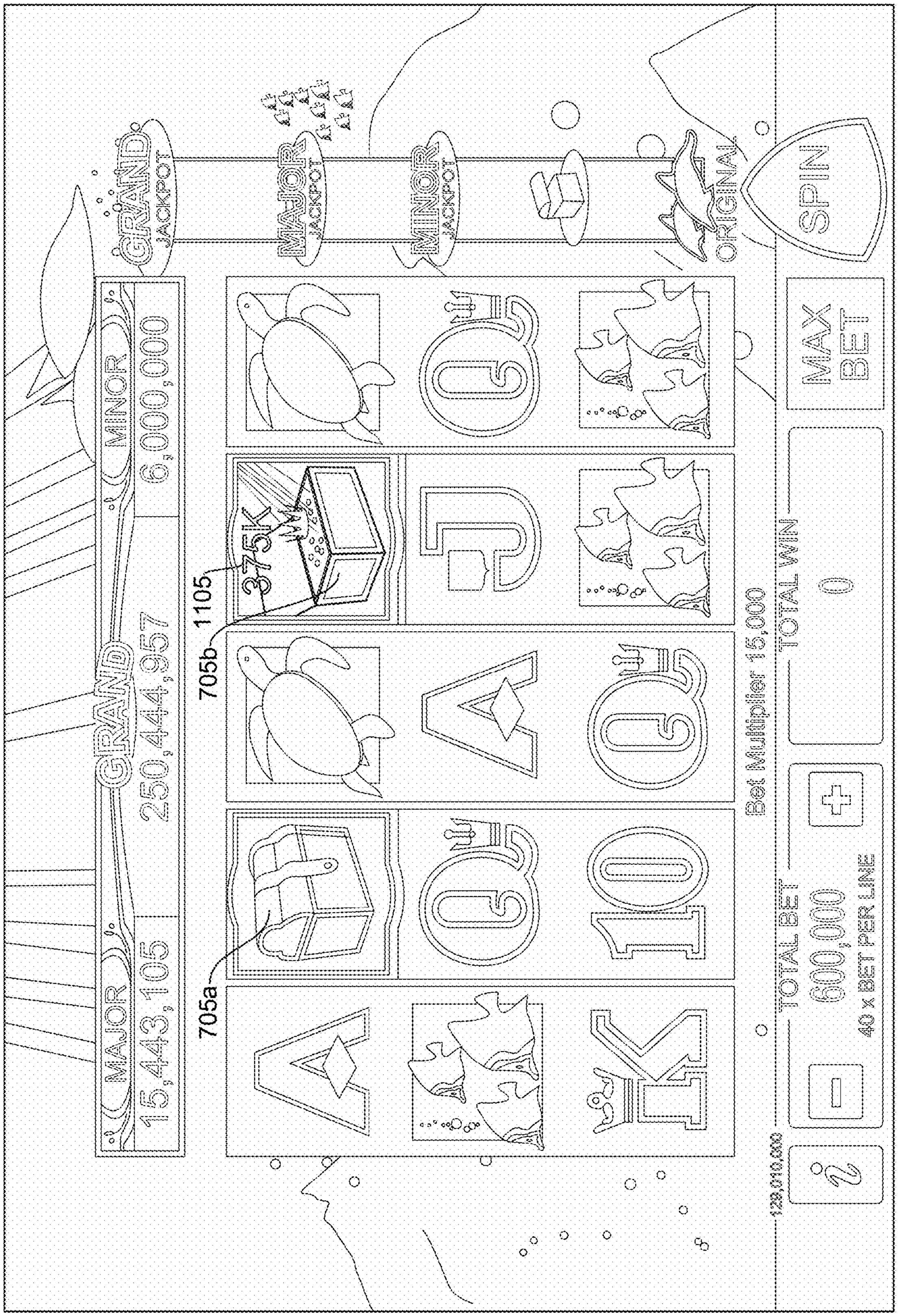
FIG. 11 shows another alternative aspect of a mystery symbol animation that may be presented on a display of an electronic gaming device according to some implementations.

FIG. 11 shows another alternative aspect of a mystery symbol animation that may be presented on a display of an electronic gaming device according to some implementations. In this example, FIG. 11 shows an example of an image that may be presented after FIG. 8 is presented. According to this example, the previously-displayed bubble 805 has burst and the revealed mystery symbol image 1105 is being presented. In this instance, the revealed mystery symbol image 1105 corresponds to an award of 375,000 credits. Visual effects corresponding to the credit award may subsequently be presented.

Although the revealed mystery symbol image 1105 corresponds with, and is shown to emerge from, the mystery symbol 705*b* in this example, in some alternative examples the revealed mystery symbol image 1105 may correspond with another mystery symbol, e.g., the mystery symbol 705*a*. According to some such examples, the revealed mystery symbol image 905 may be shown to emerge from the mystery symbol 705*b* or from another mystery symbol. In such instances, the credit may be awarded and a feature may be triggered.

In some implementations, no award corresponding to a revealed mystery symbol image will be granted unless a sufficient wager has been received. According to some such implementations, different awards may require different wagering levels. For example, a feature award may require one wagering level, a minor jackpot award may require a second wagering level, a major jackpot award may require a third wagering level and a grand jackpot award may require a fourth wagering level.

In some such implementations, the first visual effects that are presented according to block 610 of FIG. 6 also may include one or more wagering images indicating that a wager has been received that is sufficient to enable an award to be triggered. The one or more wagering images may, in some instances, include at least one bet meter image. The award may, in some instances, correspond to a revealed mystery symbol image that may be presented according to block 615. The award may, for example, include a feature award, a credit award or a jackpot award.

Figure 12:
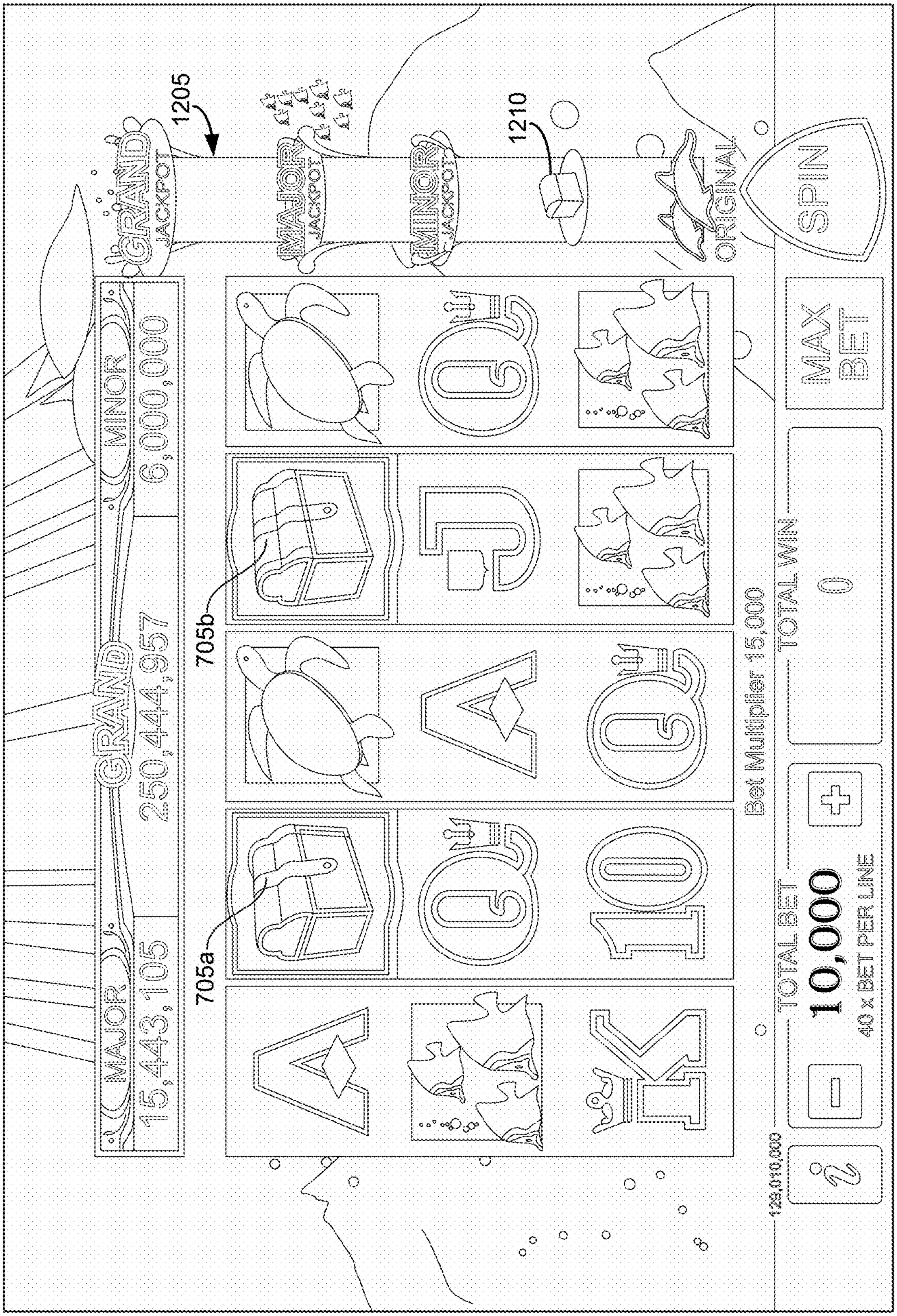
FIG. 12 shows an example of visual effects that may be presented on a display of an electronic gaming device, including a bet meter in a first state.

FIG. 12 shows an example of visual effects that may be presented on a display of an electronic gaming device, including a bet meter in a first state. In the example shown in FIG. 12, the total bet is 10,000 credits. According to this example, the bet meter 1205 includes a chest 1210, which is shown to be closed at this wagering level. According to some such examples, the closed condition of the chest 1210 indicates that no feature can be triggered and no jackpot can be awarded via the mystery symbols 705*a* and 705*b* at the wagering level of 10,000 credits.

Figure 13:
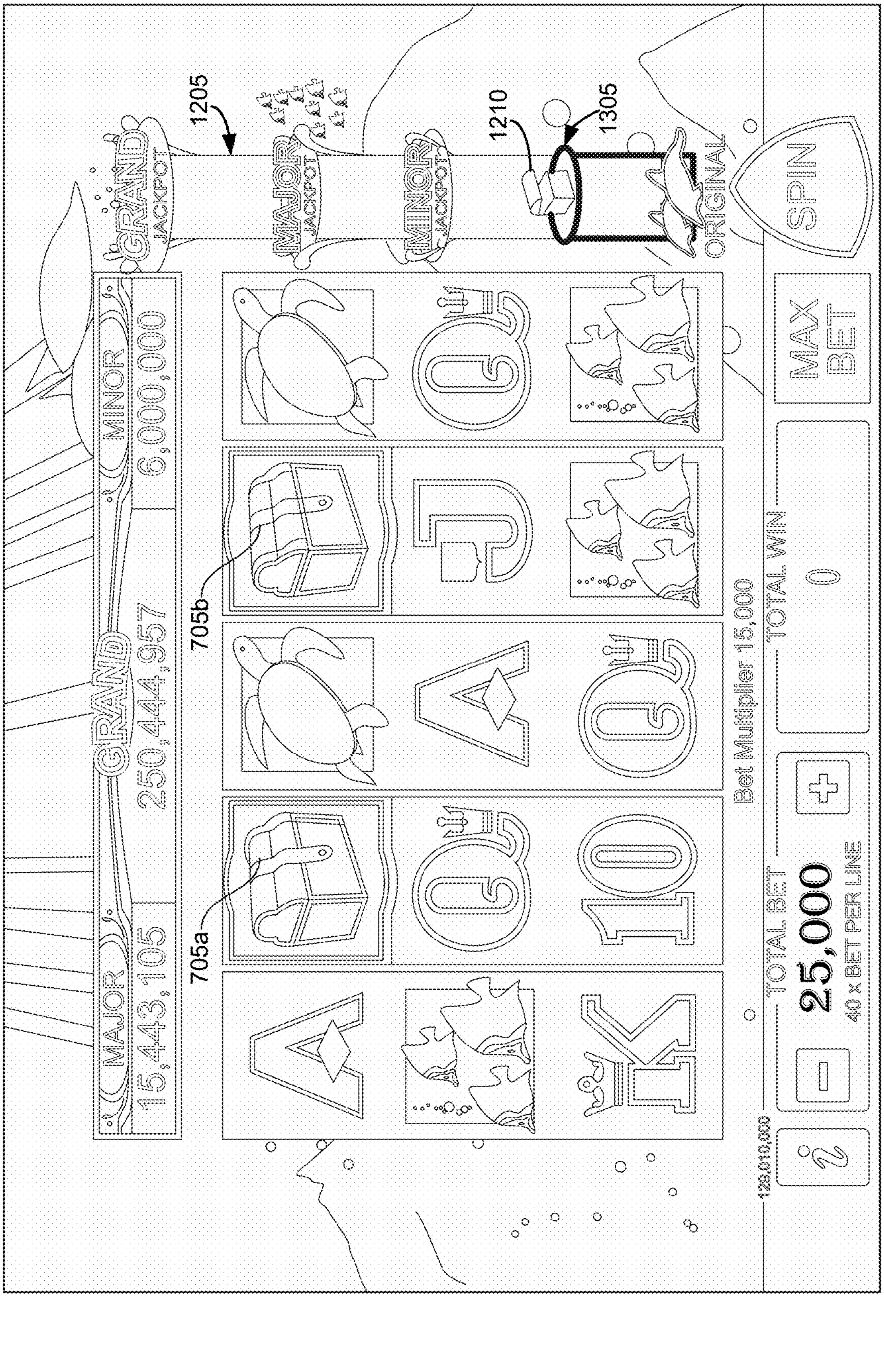
FIG. 13 shows an example of visual effects that may be presented on a display of an electronic gaming device, including a bet meter in a second state.

FIG. 13 shows an example of visual effects that may be presented on a display of an electronic gaming device, including a bet meter in a second state. In the example shown in FIG. 13, the total bet has been increased to 25,000 credits. According to this example, the bet meter 1205 is shown to be filled to level 1305 and the chest 1210 is shown to be open at this wagering level. According to some implementations, the image of FIG. 13 may be presented as part of a bet meter animation that may, for example, show the bet meter appearing to fill with water up to the level 1305 and the chest appearing to open. According to some such examples, the open condition of the chest 1210 indicates that a feature could possibly be triggered via the mystery symbols 705*a* and 705*b*. In some instances, one or more other awards (such as one or more credit awards) could potentially be granted at this wagering level, e.g., via an award corresponding to a revealed mystery symbol image.

Figure 14:
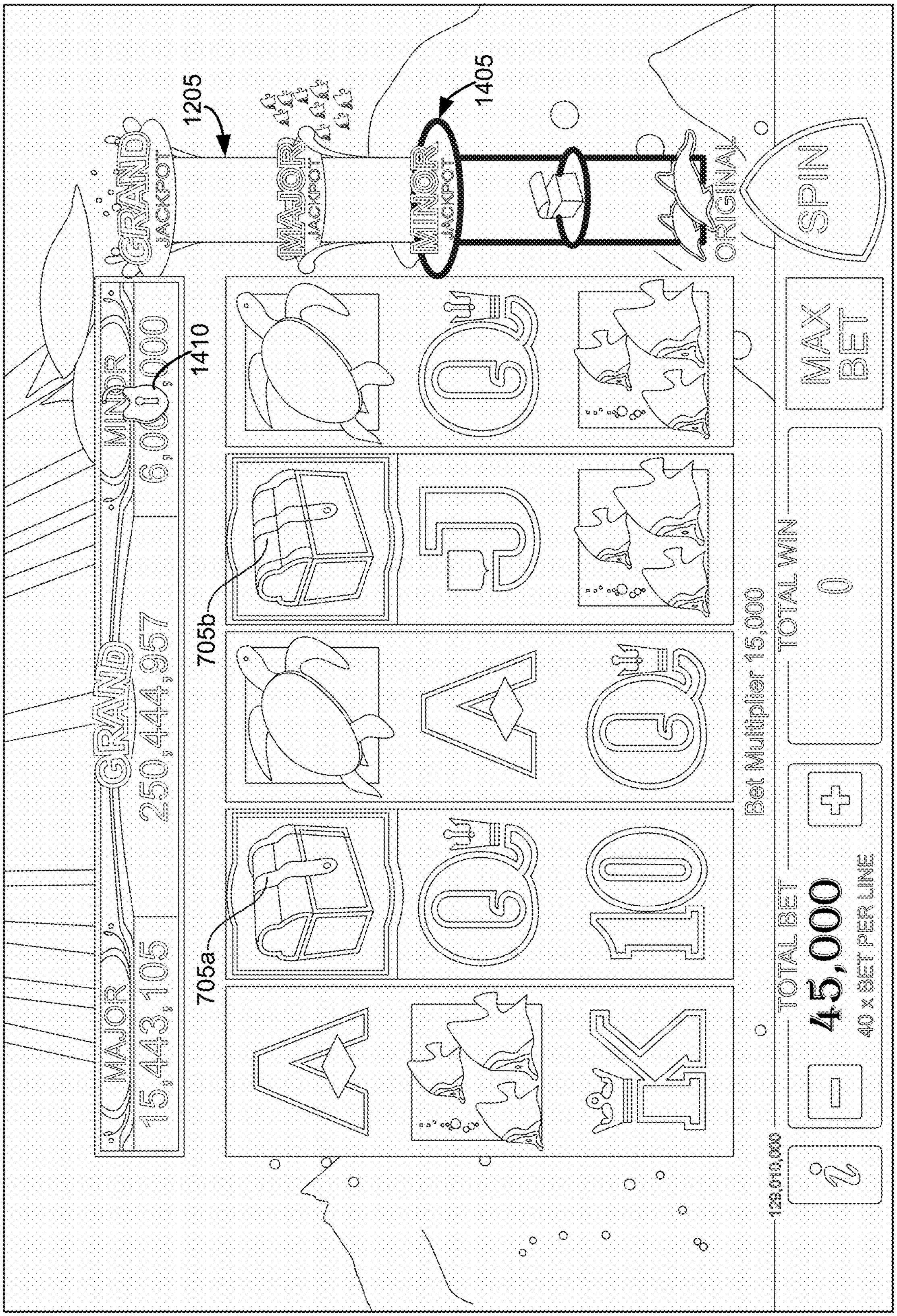
FIG. 14 shows an example of visual effects that may be presented on a display of an electronic gaming device, including a bet meter in a third state.

FIG. 14 shows an example of visual effects that may be presented on a display of an electronic gaming device, including a bet meter in a third state. In the example shown in FIG. 14, the total bet has been increased to 45,000 credits. According to this example, the bet meter 1205 is shown to be filled to level 1405 at this wagering level, which corresponds to the minor jackpot level. In this example, an opened padlock 1410 now appears over the minor jackpot meter. The opened padlock 1410 and the bet meter 1205 being filled to the minor jackpot level indicate that the minor jackpot could potentially be granted at this wagering level, e.g., via an award corresponding to a revealed mystery symbol image. According to some implementations, the image of FIG. 14 may be presented as part of a bet meter animation that may, for example, show the bet meter appearing to fill with water up to the level 1405 and the opened padlock 1410 opening.

Figure 15:
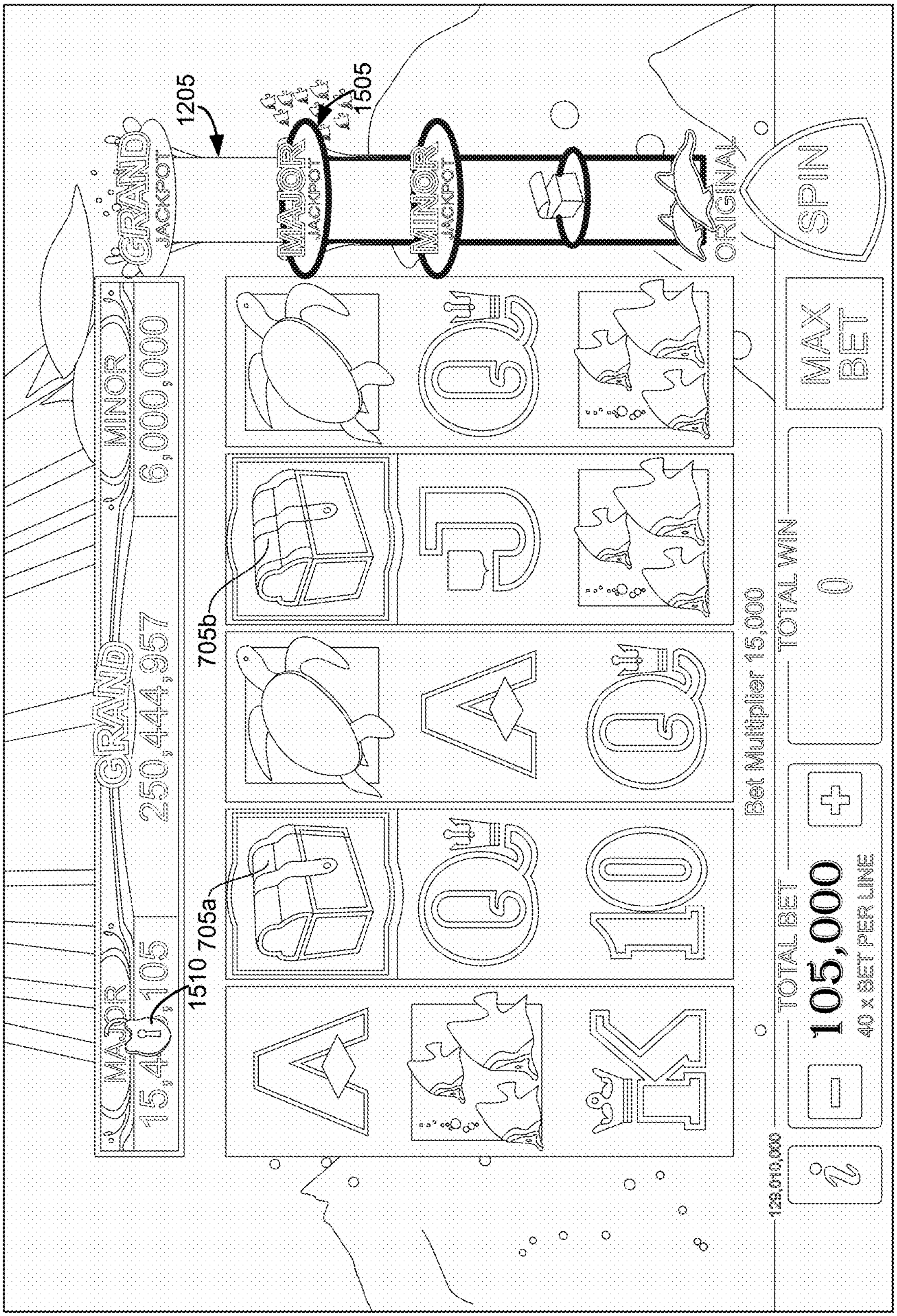
FIG. 15 shows an example of visual effects that may be presented on a display of an electronic gaming device, including a bet meter in a fourth state.

FIG. 15 shows an example of visual effects that may be presented on a display of an electronic gaming device, including a bet meter in a fourth state. In the example shown in FIG. 15, the total bet has been increased to 105,000 credits. According to this example, the bet meter 1205 is shown to be filled to level 1505 at this wagering level, which corresponds to the major jackpot level. In this example, an opened padlock 1510 now appears over the major jackpot meter. The opened padlock 1510 and the bet meter 1205 being filled to the major jackpot level indicate that the major jackpot could potentially be granted at this wagering level, e.g., via an award corresponding to a revealed mystery symbol image. According to some implementations, the image of FIG. 15 may be presented as part of a bet meter animation that may, for example, show the bet meter appearing to fill with water up to the level 1505 and the opened padlock 1510 opening.

Figure 16:
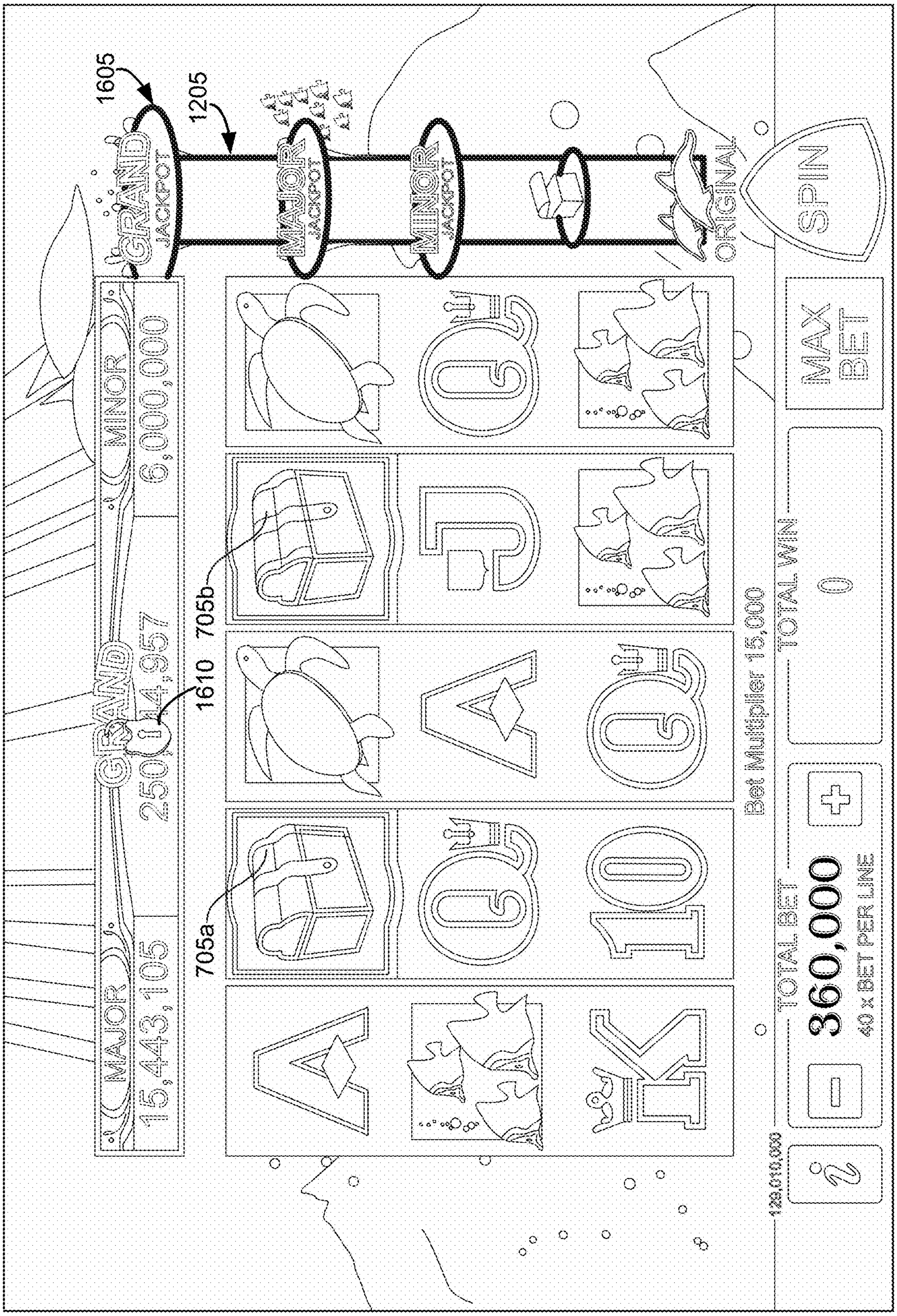
FIG. 16 shows an example of visual effects that may be presented on a display of an electronic gaming device, including a bet meter in a fifth state.

FIG. 16 shows an example of visual effects that may be presented on a display of an electronic gaming device, including a bet meter in a fifth state. In the example shown in FIG. 16, the total bet has been increased to 360,000 credits. According to this example, the bet meter 1205 is shown to be filled to level 1605 at this wagering level, which corresponds to the grand jackpot level. In this example, an opened padlock 1610 now appears over the grand jackpot meter. The opened padlock 1610 and the bet meter 1205 being filled to the grand jackpot level indicate that the grand jackpot could potentially be granted at this wagering level, e.g., via an award corresponding to a revealed mystery symbol image. According to some implementations, the image of FIG. 16 may be presented as part of a bet meter animation that may, for example, show the bet meter appearing to fill with water up to the level 1605 and the opened padlock 1610 opening.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

The invention claimed is:

1. A system, comprising:

an interface system including at least one network interface; and a control system including one or more processors, the control system being configured for:

determining which slot symbols will be presented on the display system of an end user device (EUD) for an instance of a slot game, the symbols comprising one or more mystery symbols;

receiving, from the EUD and via the interface system, an indication that a wager has been received;

communicating, via the interface system and to the EUD, instructions to cause the EUD to perform the following operations:

display, on an EUD display system, moving symbols, landing of the one or more mystery symbols, and a bet meter having a plurality of states and an award indicator image associated with a first bet level, wherein the state of the bet meter and the award indicator image indicate, based on the wager, whether an award is unavailable or can be triggered;

present, based on determining that the wager is less than a first bet level, the bet meter in a first state and the award indicator image of the bet meter in a first image state which together indicate that an award is unavailable;

present, based on determining that the wager is greater than or equal to the first bet level, the bet meter in a second state and the award indicator image of the bet meter in a second image state which together indicate that the award can be triggered;

present, based on determining that the wager is greater than or equal to the first bet level, a first mystery symbol animation revealing a first revealed mystery symbol image, wherein the award corresponds to the first revealed mystery symbol image; and present, based on determining that the wager is greater than or equal to the first bet level and on displaying the first revealed mystery symbol image, the award.

2. The system of claim 1, wherein:

each of the one or more mystery symbols is also a trigger symbol, presenting two or more mystery symbols corresponds to the presentation of the award, the first revealed mystery symbol image is also a trigger symbol, and presenting the award is further based on presenting both the first revealed mystery symbol image and the first mystery symbol together.

3. The system of claim 2, wherein:

the award indicator image is a chest, the first image state of the award indicator image is a closed chest, and the second image state of the award indicator image is an open chest.

4. The system of claim 1, wherein the award is the presentation of a feature game, a credit award, or a jackpot award.

5. The system of claim 1, wherein the control system is further configured for:

communicating, via the interface system and to the EUD, instructions to cause the EUD to display, on the EUD display system, an award meter corresponding to the award and to present, based on determining that the wager is greater than or equal to the first bet level, a first wagering image corresponding to the award, wherein presenting the first wagering image, the bet meter in the second state, and the award indicator image in the second image state together indicate that the award can be triggered.

6. The system of claim 5, wherein presenting the first wagering image further includes presenting the first wagering image at least partially overlapping with the displayed award meter.

7. The system of claim 6, wherein the first wagering image is an opened lock.

8. The system of claim 1, wherein:

presenting the bet meter in the second state comprises visual effects of the bet meter filled to a level.

9. The system of claim 1, wherein:

the bet meter further includes a second award indicator image associated with a second bet level higher than the first bet level, the state of the bet meter and the second award indicator image indicate, based on the wager, whether a second award is unavailable or can be triggered, and the control system is further configured for communicating, via the interface system and to the EUD, instructions to cause the EUD to perform the following operations:

present, based on determining that the wager is less than the second bet level and greater than or equal to the first bet level, the bet meter in a third state and the second award image in a first image state which together indicate that the second award is unavailable;

present, based on determining that the wager is greater than or equal to the second bet level, the bet meter in a fourth state and the second award image in a second image state which together indicate that the second award can be triggered;

present, based on determining that the wager is greater than or equal to the second bet level, the first mystery symbol revealing the first revealed mystery symbol image, wherein the second award corresponds to the first revealed mystery symbol image; and present, based on determining that the wager is greater than or equal to the second bet level and on displaying the first revealed mystery symbol image, the second award.

10. The system of claim 1, wherein the system includes one or more servers.

11. A method of controlling an electronic gaming system, the method comprising:

determining which slot symbols will be presented on a display system of an end user device (EUD) for an instance of a slot game, the symbols comprising one or more mystery symbols;

receiving, from the EUD and via an interface system, an indication that a wager has been received;

communicating, via the interface system and to the EUD, instructions to cause the EUD to perform the following operations:

display, on the EUD display system, moving symbols, landing of the one or more mystery symbols, and a bet meter having a plurality of states and an award indicator image associated with a first bet level, wherein the state of the bet meter and the award indicator image indicate, based on the wager, whether an award is unavailable or can be triggered;

present, on the EUD display system and based on determining that the wager is less than a first bet level, the bet meter in a first state and the award indicator image of the bet meter in a first image state which together indicate that an award is unavailable;

present, on the EUD display system and based on determining that the wager is greater than or equal to the first bet level, the bet meter in a second state and the award indicator image of the bet meter in a second image state which together indicate that the award can be triggered;

present, on the EUD display system and based on determining that the wager is greater than or equal to the first bet level, a first mystery symbol animation revealing a first revealed mystery symbol image, wherein the award corresponds to the first revealed mystery symbol image; and present, on the EUD display system and based on determining that the wager is greater than or equal to the first bet level and on displaying the first revealed mystery symbol image, the award.

12. The method of claim 11, wherein:

each of the one or more mystery symbols is also a trigger symbol, presenting two or more mystery symbols corresponds to the presentation of the award, the first revealed mystery symbol image is also a trigger symbol, and presenting the award is further based on presenting both the first revealed mystery symbol image and the first mystery symbol together.

13. The method of claim 11, wherein:

presenting the bet meter in the second state comprises visual effects of the bet meter filled to a level.

14. The method of claim 13, wherein:

the award indicator image is a chest, the first image state of the award indicator image is a closed chest, and the second image state of the award indicator image is an open chest.

15. The method of claim 11, wherein the award is the presentation of a feature game, a credit award, or a jackpot award.

16. The method of claim 11, further comprising communicating, via the interface system and to the EUD, instructions to cause the EUD to perform the following operations:

display, on the display system, an award meter corresponding to the award; and present, based on determining that the wager is greater than or equal to the first bet level, a first wagering image corresponding to the award, wherein presenting the first wagering image, the bet meter in the second state, and the award indicator image in the second image state together indicate that the award can be triggered.

17. The method of claim 16, wherein presenting the first wagering image further includes presenting the first wagering image at least partially overlapping with the displayed award meter.

18. The method of claim 16, wherein the first wagering image is an opened lock.

19. The method of claim 11, wherein:

the bet meter further includes a second award indicator image associated with a second bet level higher than the first bet level, the state of the bet meter and the second award indicator image indicate, based on the wager, whether a second award is unavailable or can be triggered, and the method further comprises communicating, via the interface system and to the EUD, instructions to cause the EUD to perform the following operations:

present, based on determining that the wager is less than the second bet level and greater than or equal to the first bet level, the bet meter in a third state and the second award image in a first image state which together indicate that the second award is unavailable present, based on determining that the wager is greater than or equal to the second bet level, the bet meter in a fourth state and the second award image in a second image state which together indicate that the second award can be triggered;

present, based on determining that the wager is greater than or equal to the second bet level, the first mystery symbol revealing the first revealed mystery symbol image, wherein the second award corresponds to the first revealed mystery symbol image; and present, based on determining that the wager is greater than or equal to the second bet level and on displaying the first revealed mystery symbol image, the second award.

20. The method of claim 11, wherein the method is performed, at least in part, by one or more servers.

* * * * *